(12) United States Patent
Masuda

(10) Patent No.: US 10,877,316 B2
(45) Date of Patent: Dec. 29, 2020

(54) LIGHTING DEVICE AND DISPLAY DEVICE

(71) Applicant: SHARP KABUSHIKI KAISHA, Sakai (JP)

(72) Inventor: Takeshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/584,538

(22) Filed: Sep. 26, 2019

(65) Prior Publication Data

US 2020/0110309 A1    Apr. 9, 2020

Related U.S. Application Data

(60) Provisional application No. 62/740,876, filed on Oct. 3, 2018.

(51) Int. Cl.
*G02F 1/13357* (2006.01)
*G02F 1/1347* (2006.01)

(52) U.S. Cl.
CPC .... *G02F 1/133605* (2013.01); *G02F 1/13473* (2013.01)

(58) Field of Classification Search
CPC ................ G02F 1/133605; G02F 1/13473
See application file for complete search history.

(56) References Cited

U.S. PATENT DOCUMENTS

| | | | |
|---|---|---|---|
| 2015/0036317 A1* | 2/2015 | Yamamoto | F21V 13/02 362/84 |
| 2016/0070137 A1 | 3/2016 | You et al. | |
| 2017/0122529 A1* | 5/2017 | Yamada | F21V 1/17 |
| 2018/0180255 A1 | 6/2018 | Yamada | |
| 2019/0195469 A1 | 6/2019 | Yamada | |

FOREIGN PATENT DOCUMENTS

JP    2017-092021 A    5/2017

* cited by examiner

*Primary Examiner* — Donald L Raleigh
(74) *Attorney, Agent, or Firm* — ScienBiziP, P.C.

(57) ABSTRACT

A lighting device includes a light source, a light reflecting unit, and a light diffusing unit. The light reflecting unit is arranged on an exit side of a light exit path with respect to the light source to reflect at least a part of a light emitted from the light source and transmit a part of the light. The light reflecting unit has an angle selecting property such that a reflectance of a light having a small incident angle becomes higher than a reflectance of a light having a large incident angle. The light diffusing unit is arranged between the light source and the light reflecting unit in the light exit path to diffuse the light.

24 Claims, 22 Drawing Sheets

FIG.12

| | | STIMULUS VALUE X | STIMULUS VALUE Y | STIMULUS VALUE Z | DETERMINATION RESULT |
|---|---|---|---|---|---|
| COMPARATIVE EXAMPLE 1 | IMAGE | | | | × |
| | AVERAGE LUMINANCE [cd/m²] | 18612 | 19279 | 37861 | |
| COMPARATIVE EXAMPLE 2A | IMAGE | | | | × |
| | AVERAGE LUMINANCE [cd/m²] | 26091 | 27147 | 52065 | |
| COMPARATIVE EXAMPLE 2B | IMAGE | | | | × |
| | AVERAGE LUMINANCE [cd/m²] | 27738 | 28757 | 55569 | |
| COMPARATIVE EXAMPLE 2C | IMAGE | | | | × |
| | AVERAGE LUMINANCE [cd/m²] | 28646 | 29864 | 40595 | |

FIG.13

| | | STIMULUS VALUE X | STIMULUS VALUE Y | STIMULUS VALUE Z | DETERMINATION RESULT |
|---|---|---|---|---|---|
| EXAMPLE 1A | IMAGE | | | | ◎ |
| | AVERAGE LUMINANCE [cd/m²] | 15420 | 16074 | 30834 | |
| EXAMPLE 1B | IMAGE | | | | ○ |
| | AVERAGE LUMINANCE [cd/m²] | 16378 | 17093 | 32806 | |
| EXAMPLE 1C | IMAGE | | | | ○ |
| | AVERAGE LUMINANCE [cd/m²] | 20275 | 21091 | 40595 | |

FIG.16

| | STIMULUS VALUE X | STIMULUS VALUE Y | STIMULUS VALUE Z | DETERMINATION RESULT |
|---|---|---|---|---|
| EXAMPLE 2A | IMAGE / AVERAGE LUMINANCE [cd/m²] 17160 | IMAGE / AVERAGE LUMINANCE [cd/m²] 18214 | IMAGE / AVERAGE LUMINANCE [cd/m²] 31300 | ○ |
| EXAMPLE 2B | IMAGE / AVERAGE LUMINANCE [cd/m²] 18323 | IMAGE / AVERAGE LUMINANCE [cd/m²] 19375 | IMAGE / AVERAGE LUMINANCE [cd/m²] 33632 | ○ |
| EXAMPLE 2C | IMAGE / AVERAGE LUMINANCE [cd/m²] 21506 | IMAGE / AVERAGE LUMINANCE [cd/m²] 22774 | IMAGE / AVERAGE LUMINANCE [cd/m²] 39327 | △ |
| COMPARATIVE EXAMPLE 3 | IMAGE / AVERAGE LUMINANCE [cd/m²] 20320 | IMAGE / AVERAGE LUMINANCE [cd/m²] 21522 | IMAGE / AVERAGE LUMINANCE [cd/m²] 37356 | × |

|  | STIMULUS VALUE X | STIMULUS VALUE Y | STIMULUS VALUE Z | DETERMINATION RESULT |
|---|---|---|---|---|
| EXAMPLE 3A IMAGE | | | | ○ |
| AVERAGE LUMINANCE [cd/m²] | 19284 | 19096 | 34430 | |
| EXAMPLE 3B IMAGE | | | | △ |
| AVERAGE LUMINANCE [cd/m²] | 20046 | 20368 | 39630 | |
| EXAMPLE 3C IMAGE | | | | ◎ |
| AVERAGE LUMINANCE [cd/m²] | 23067 | 23954 | 44699 | |
| COMPARATIVE EXAMPLE 4 IMAGE | | | | × |
| AVERAGE LUMINANCE [cd/m²] | 19284 | 21422 | 40312 | |

| | | STIMULUS VALUE X | STIMULUS VALUE Y | STIMULUS VALUE Z | DETERMINATION RESULT |
|---|---|---|---|---|---|
| EXAMPLE 4A | IMAGE | | | | ○ |
| | AVERAGE LUMINANCE [cd/m²] | 19284 | 19301 | 41447 | |
| EXAMPLE 4B | IMAGE | | | | ○ |
| | AVERAGE LUMINANCE [cd/m²] | 20227 | 20132 | 43632 | |
| EXAMPLE 4C | IMAGE | | | | △ |
| | AVERAGE LUMINANCE [cd/m²] | 22544 | 22321 | 48827 | |
| COMPARATIVE EXAMPLE 5 | IMAGE | | | | × |
| | AVERAGE LUMINANCE [cd/m²] | 247110 | 24425 | 53024 | |

FIG.22

| | | STIMULUS VALUE X | STIMULUS VALUE Y | STIMULUS VALUE Z | DETERMINATION RESULT |
|---|---|---|---|---|---|
| EXAMPLE 5A | IMAGE | | | | ○ |
| | AVERAGE LUMINANCE [cd/m²] | 26334 | 30248 | 36981 | |
| EXAMPLE 5B | IMAGE | | | | ○ |
| | AVERAGE LUMINANCE [cd/m²] | 26930 | 30759 | 38801 | |
| EXAMPLE 5C | IMAGE | | | | ○ |
| | AVERAGE LUMINANCE [cd/m²] | 28104 | 31029 | 44554 | |
| COMPARATIVE EXAMPLE 6 | IMAGE | | | | × |
| | AVERAGE LUMINANCE [cd/m²] | 28943 | 32226 | 45968 | |

FIG.24

| | STIMULUS VALUE X | STIMULUS VALUE Y | STIMULUS VALUE Z | DETERMINATION RESULT |
|---|---|---|---|---|
| EXAMPLE 6A | IMAGE<br>AVERAGE LUMINANCE [cd/m²] 28331 | IMAGE<br>AVERAGE LUMINANCE [cd/m²] 33253 | IMAGE<br>AVERAGE LUMINANCE [cd/m²] 32139 | ◎ |
| EXAMPLE 6B | IMAGE<br>AVERAGE LUMINANCE [cd/m²] 28328 | IMAGE<br>AVERAGE LUMINANCE [cd/m²] 32687 | IMAGE<br>AVERAGE LUMINANCE [cd/m²] 34698 | ○ |
| EXAMPLE 6C | IMAGE<br>AVERAGE LUMINANCE [cd/m²] 29569 | IMAGE<br>AVERAGE LUMINANCE [cd/m²] 33270 | IMAGE<br>AVERAGE LUMINANCE [cd/m²] 39486 | △ |
| COMPARATIVE EXAMPLE 7 | IMAGE<br>AVERAGE LUMINANCE [cd/m²] 28943 | IMAGE<br>AVERAGE LUMINANCE [cd/m²] 32226 | IMAGE<br>AVERAGE LUMINANCE [cd/m²] 39528 | × |

LIGHTING DEVICE AND DISPLAY DEVICE

CROSS REFERENCE TO RELATED APPLICATION

This application claims priority from U.S. Provisional Patent Application No. 62/740,876 filed on Oct. 3, 2018. The entire contents of the priority application are incorporated herein by reference.

TECHNICAL FIELD

The technology described herein relates to a lighting device and display device.

BACKGROUND ART

As an example of a backlight device used in a conventional liquid crystal display device is described in Japanese Unexamined Patent Application Publication No. 2017-92021. The backlight device described in Japanese Unexamined Patent Application Publication No. 2017-92021 includes a base body with a light reflecting surface on a front surface, a light source mounted in plurals on the light reflecting surface side of the base body, and a half mirror that is arranged to face the base body with the light source in between and that reflects a part of the incident light and transmits a part of the incident light, where the reflectance of the half mirror with respect to the light emitting wavelength of the light source is lower for the oblique incidence than the perpendicular incidence.

In backlight device, the light perpendicularly entering the half mirror is reflected more than the obliquely entering light but most of the light reflected by the half mirror and returned toward the light source side exists in the vicinity of the light source, and is less likely to spread toward the region between the adjacent light sources. Thus, luminance unevenness may occur.

SUMMARY

The technology described herein has been completed based on the situations described above, and aims to improve the luminance unevenness.

A lighting device according to the technology described herein includes: a light source; a light reflecting unit that is arranged on an exit side of a light exit path with respect to the light source to reflect at least a part of a light emitted from the light source and transmit a part of the light, and having an angle selecting property such that a reflectance of a light having a small incident angle becomes higher than a reflectance of a light having a large incident angle; and a light diffusing unit that is arranged between the light source and the light reflecting unit in the light exit path to diffuse the light.

A display device includes the lighting device described above and a display panel configured to display an image using light from the lighting device.

According to the technology described herein, the luminance unevenness can be improved.

BRIEF DESCRIPTION OF THE DRAWINGS

FIG. 12 is a table showing the experiment results of a comparative example 1 and comparative examples 2A to 2C in a first comparative experiment.

FIG. 13 is a table showing the experiment results of the examples 1A to 1C in the first comparative experiment.

FIG. 16 is a table showing the experiment results of a comparative example 3 and examples 2A to 2C in a second comparative experiment.

FIG. 18 is a table showing experiment results of a comparative example 4 and examples 3A to 3C in a third comparative experiment.

FIG. 20 is a table showing experiment results of a comparative example 5 and examples 4A to 4C in a fourth comparative experiment.

FIG. 22 is a table showing experiment results of a comparative example 6 and examples 5A to 5C in a fifth comparative experiment.

FIG. 24 is a table showing experiment results of a comparative example 7 and examples 6A to 7C in a sixth comparative experiment.

DETAILED DESCRIPTION

First Embodiment

A first embodiment will be described with reference to FIGS. 1 to 13. In the present embodiment, a liquid crystal display device (display device) 10 and a backlight device (lighting device) 12 arranged therein will be exemplified. X axis, Y axis, and Z axis are shown at one part of each figure, and each axial direction is drawn to indicate the direction shown in each figure. Furthermore, the upper side of FIG. 1 is the front side, and the lower side is the back side.

Figure 1:
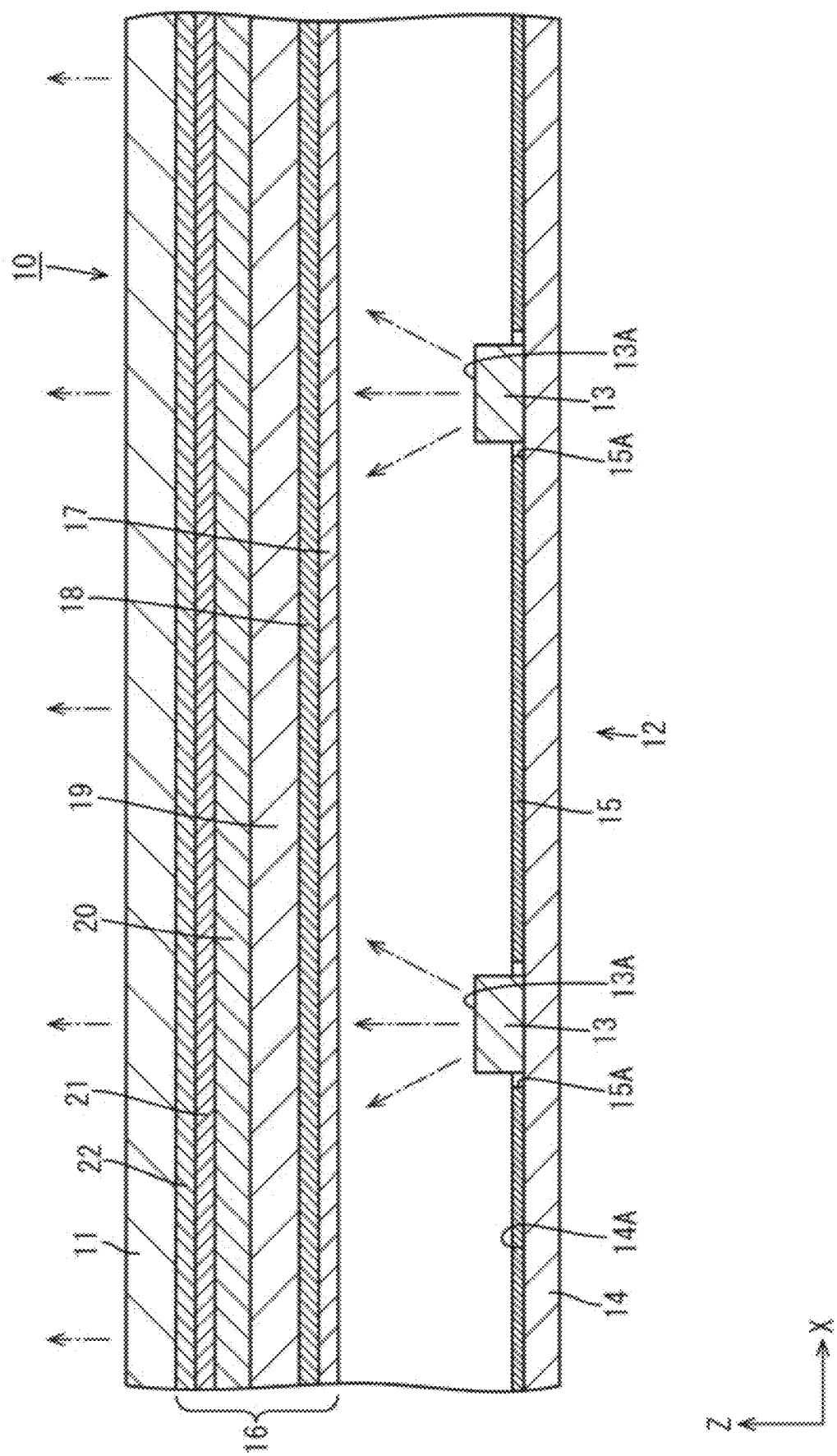
FIG. 1 is a cross-sectional view of a liquid crystal display device according to a first embodiment.

As shown in FIG. 1, the liquid crystal display device 10 includes at least a liquid crystal panel (display panel) 11 that can display images, and backlight device 12 which is an external light source arranged on the back side with respect to the liquid crystal panel 11 to irradiate the liquid crystal panel 11 with light for display. The liquid crystal panel 11 has a configuration in which a pair of glass substrates are attached with a predetermined gap and liquid crystals are filled between the glass substrates. One glass substrate (array substrate, active matrix substrate) is provided with a switching element (e.g., TFT) connected to a source line and a gate line orthogonal to each other, a pixel electrode connected to the switching element, an orientation film, and the like, and the other glass substrate (opposing substrate, CF substrate) is provided with an orientation film and the like in addition to a color filter in which each coloring units such as R (red), G (green) and B (blue) are arranged at a predetermined array and a black matrix that partitions the color filters. A polarization plate is arranged on the outer sides of the glass substrates.

Next, the backlight device 12 will be described in detail. As shown in FIG. 1, the backlight device 12 includes an LED 13 serving as a light source, an LED substrate (light source substrate) 14 on which the LED 13 is mounted, a reflection sheet 15 arranged to cover the surface of the LED substrate 14 to reflect light, and an optical sheet (optical member) 16 arranged on the front side (light exit side) with respect to the LED 13 with a spacing. Thus, the backlight device 12 according to the present embodiment is a so-called direct type in which the LED 13 is arranged at a position immediately below the liquid crystal panel 11 and the optical sheet 16. The backlight device 12 preferably includes a chassis that accommodates the LED substrate 14, and the like and a frame-shaped frame that holds the outer peripheral end of the optical sheet 16. Hereinafter, each configuring parts of the backlight device 12 will be described in detail.

Figure 2:
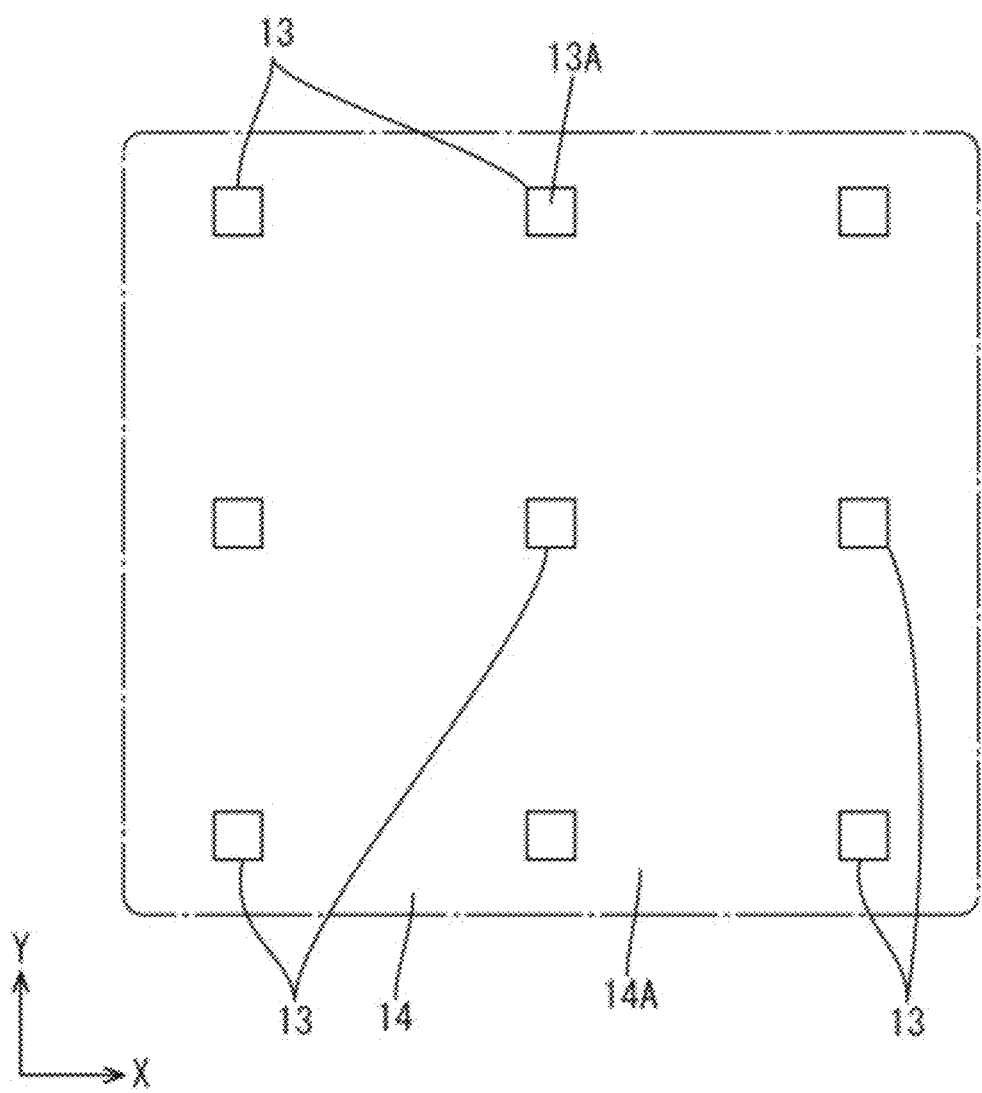
FIG. 2 is a plan view showing a planar arrangement of an LED in an LED substrate configuring a backlight device arranged in the liquid crystal display device.
Figure 3:
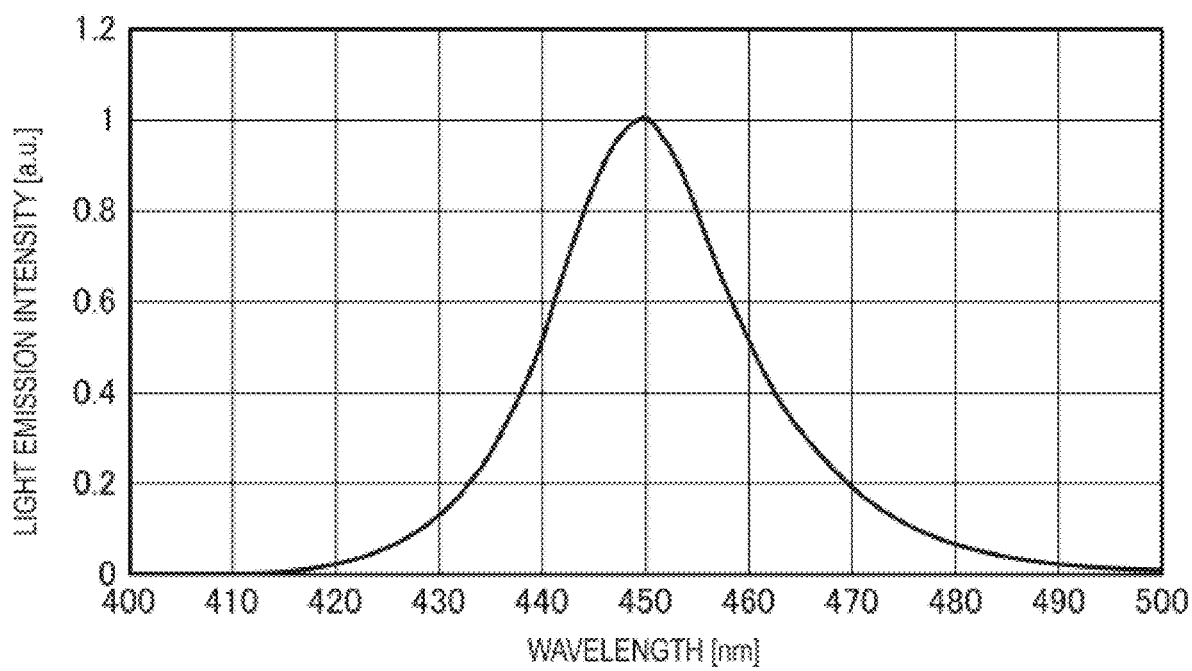
FIG. 3 is a graph showing a light emission spectrum of the LED.

As shown in FIGS. 1 and 2, the LED 13 is arranged in plurals in a matrix form (rows and columns) along the X axis direction and the Y axis direction at intervals within a plate surface of the LED substrate 14. The LED 13 is a so-called top surface light emitting type in which the LED 13 is surface mounted on the LED substrate 14 and the light emitting surface 13A is facing the side opposite to the LED substrate 14 side. Specifically, the LED 13 includes a blue LED element (blue light emitting element, blue LED chip), which emits a single light of blue color. The blue LED element arranged in the LED 13 is a semiconductor formed of a semiconductor material such as InGaN, for example, and emits light of a single color of blue light, which is a visible light ray in a wavelength region (about 400 nm to about 500 nm) belonging to blue when voltage is applied in a forward direction. A specific light emission spectrum of the LED 13 is as shown in FIG. 3. According to FIG. 3, the LED 13 has a light emission spectrum in which the light emission peak wavelength is about 450 nm, the half value width is about 20 nm, and the light emitting wavelength range is 410 nm to 500 nm. In the present embodiment, a case in which "ES-VADBA12B" manufactured by Epistar, Co. for example, is used for the LED 13 has been illustrated, but, of course, other products may be used.

As shown in FIG. 1, the LED substrate 14 has a plate shape having a plate surface parallel to the plate surfaces of the reflection sheet 15 and the optical sheet 16. The LED substrate 14 has the plate surface on the front side facing the plate surfaces of the reflection sheet 15 and the optical sheet 16, which becomes the mounting surface 14A on which the LED 13 is surface mounted. A line pattern formed of metal film such as copper foil and the like is formed on the mounting surface 14A of the LED substrate 14, and power is supplied to each LED 13 by such line pattern.

The reflection sheet 15 is formed by vapor depositing metal such as silver on the surface of the base material made of synthetic resin such as PET, and the front surface presents a silver color excelling in light reflectivity. As shown in FIG. 1, the reflection sheet 15 is stacked to cover the mounting surface 14A of the LED substrate 14 from the front side over substantially the entire region, and is opened and formed with an LED insertion hole 15A for individually passing each LED 13 to a position superimposing each LED 13. The LED insertion hole 15A is arranged in plurals in a matrix formed along the X axis direction and the Y axis direction at intervals to match each LED 13 in the LED substrate 14. In the present embodiment, a case in which "BL film" manufactured by Oike Co. Ltd., for example, is used for the reflection sheet 15 has been illustrated, but of course, other products can be used. For example, that which is entirely made of synthetic resin and the surface presents white that excels in light reflectivity can be used for the reflection sheet 15.

As shown in FIG. 1, the optical sheet 16 has a sheet-form having a plate surface parallel to the plate surfaces of the liquid crystal panel 11, the LED substrate 14, and the like. The optical sheet 16 is arranged interposed between the liquid crystal panel 11 and the LED 13 in the Z axis direction (normal direction of the plate surface of the optical sheet 16 etc.). That is, the optical sheet 16 can be said as being arranged at the exit of the light exit path in the backlight device 12, and thus has a function of exiting the light emitted from the LED 13 toward the liquid crystal panel 11 while applying a predetermined optical action. In the optical sheet 16, the plate surface on the back side facing the mounting surface 14A of the LED substrate 14 is the light entering surface to where the light enters, and the plate surface on the front side facing the liquid crystal panel 11 is the light exit surface from where the light exits. The optical sheet 16 includes six sheets stacked one over the other, and are in order from the back side, a first light diffusion sheet (light diffusing unit) 17, a blue light reflection sheet (light reflecting unit, primary light reflecting unit) 18, a second light diffusion sheet (second light diffusing unit) 19, a wavelength conversion sheet (wavelength conversion unit) 20, a first luminance enhancing sheet 21, and a second luminance enhancing sheet 22. Among them, the first light diffusion sheet 17 is arranged interposed between the LED 13 and the blue light reflection sheet 18 in the light exit path in the backlight device 12, and is arranged to be the closest to the LED 13 in the optical sheet 16. The blue light reflection sheet 18 is arranged on the LED 13 side than the wavelength conversion sheet 20 in the light exit path in the backlight device 12. The second light diffusion sheet 19 is interposed between the blue light reflection sheet 18 and the wavelength conversion sheet 20 in the light exit path in the backlight device 12. Hereinafter, the configurations, and the like of such optical sheets 16 will be described in random order.

The first luminance enhancing sheet 21 and the second luminance enhancing sheet 22 have a configuration in which a unit prism extending along the X axis direction or the Y axis direction on a plate surface in the substantially transparent base material made of synthetic resin is lined in great number in a direction (Y axis direction or X axis direction)

orthogonal to the extending direction, and selectively applies a light collecting action in a direction the unit prisms are lined with respect to the incident light. The unit prism preferably has a vertex of about 90 degrees. According to the first luminance enhancing sheet 21 and the second luminance enhancing sheet 22, the light collecting action is applied in the X axis direction and the Y axis direction, respectively, on the exit light of the backlight device 12 thus enhancing the luminance. In the present embodiment, a case where "BEF4-FT-90(24)" and "BEF4-GM-95(24)v2" manufactured by 3M Co. is used for the first luminance enhancing sheet 21 and the second luminance enhancing sheet 22 has been illustrated, but of course other products may be used.

The wavelength conversion sheet 20 is configured by a wavelength conversion layer (phosphor film) containing a phosphor (wavelength conversion substance) for wavelength converting the light from the LED 13, and a pair of protective layers (protective film) that protect the wavelength conversion layer by sandwiching from the front and the back. Detailed illustration of the wavelength conversion layer and the protective layer will be omitted. The wavelength conversion layer contains a phosphor that emits a secondary light with a blue light (primary light) from the LED 13 as an excitation light. The phosphor includes a green phosphor that emits a green light as a secondary light and a red phosphor that emits a red light as a secondary light, which green phosphor and the red phosphor are a down conversion type (down shifting type) in which the excitation wavelength is a shorter wavelength than the fluorescent wavelength. The green light referred to herein is a visible light ray having a wavelength region (about 500 nm to about 570 nm) belonging to green, and the red light is a visible light ray having a wavelength region (about 600 nm to about 780 nm) belonging to red. A quantum dot phosphor is preferably used as the green phosphor and the red phosphor contained in the wavelength conversion layer. The quantum dot phosphor encloses the electrons/positive holes and excitons in the semiconductor crystal of nano size (e.g. diameter of about 2 nm to 10 nm) in omnidirection of the three-dimensional space to have a discrete energy level, where the peak wavelength (light emission color) and the like of the emitting light can be appropriately selected by changing the dot size. In the emitting light (fluorescent light) of the quantum dot phosphor, the peak in the light emission spectrum is steep and the half value width thereof narrow, so that the color purity becomes extremely high and the color gamut becomes wide. Furthermore, the pair of protective layers that sandwich the wavelength conversion layer have a substantially transparent synthetic resin film form, and excel in moisture-proof property.

Figure 4:
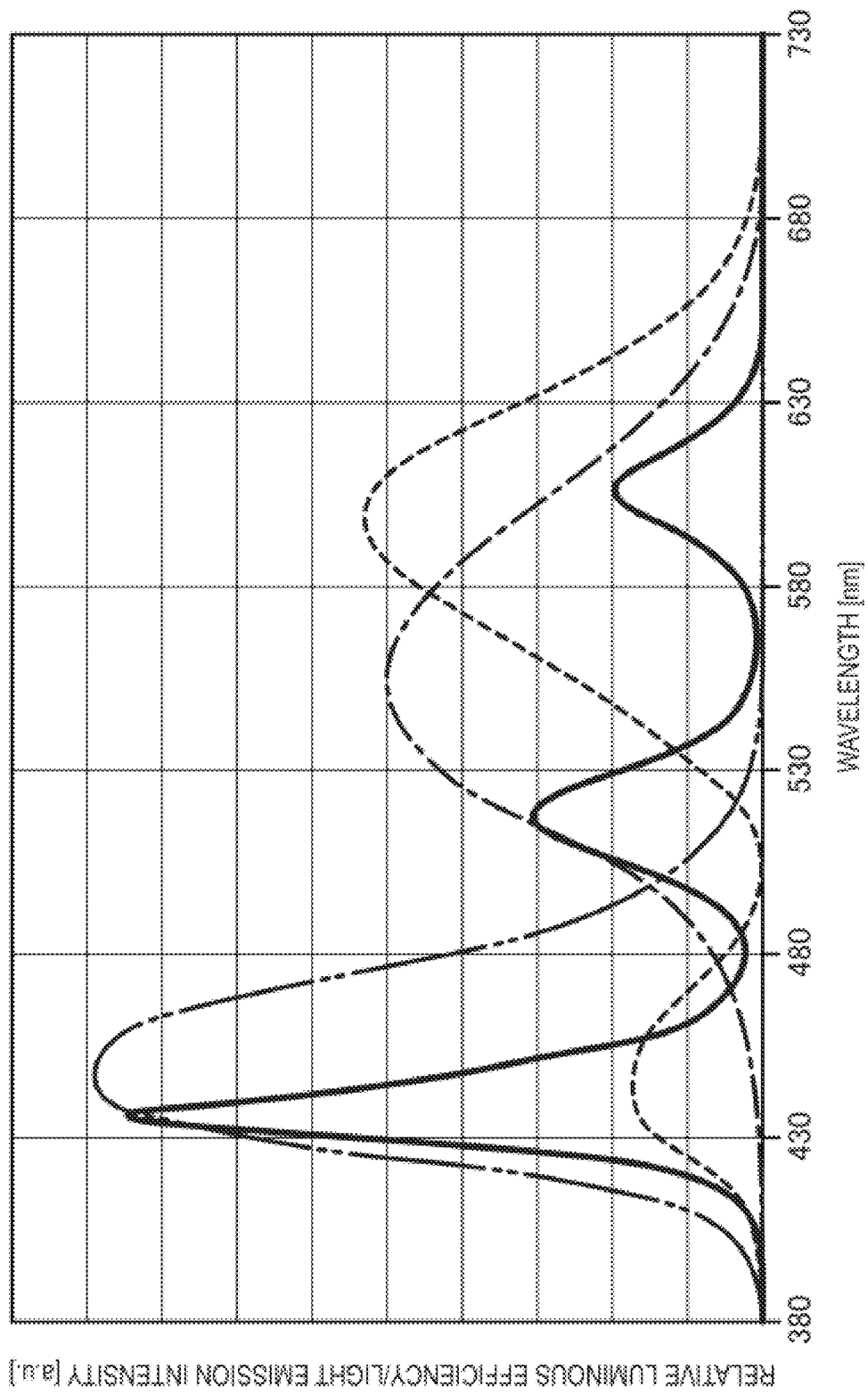
FIG. 4 is a graph showing a spectrum related to an exit light of the backlight device and a color matching function related to three stimulus values.

The blue light emitted from the LED 13 has one part wavelength converted to green light and red light by the green phosphor and the red phosphor contained in the wavelength conversion sheet 20, and the exit light of the backlight device 12 presents a substantially white color by the additive color mixing of such wavelength converted green light and red light (secondary light) and the blue light (primary light) of the LED 13. The spectrum related to the exit light of the backlight device 12 is as shown in FIG. 4. According to FIG. 4, the green phosphor has a light emission spectrum in which the light emission peak is about 510 nm and the light emitting wavelength range is 490 nm to 560 nm. The red phosphor has a light emission spectrum in which the light emission peak is about 610 nm and the light emitting wavelength range is 570 nm to 650 nm. In FIG. 4, a color matching function related to the three stimulus values of the XYZ color system is also described. The three stimulus values include a stimulus value X, a stimulus value Y and a stimulus value Z. The color matching function related to the stimulus value X is wide that crosses the wavelength regions of blue, green and red, but the wavelength region of red (stimulus value R of RGB color system) is dominant. The color matching function related to the stimulus value Y crosses the wavelength regions of green and red, but the wavelength region of green (stimulus value G of RGB color system) is dominant. In the color matching function related to the stimulus value Z, the wavelength region of blue (stimulus value B of RGB color system) is dominant. By multiplying the function of the wavelength related to the spectrum of the observation light with respect to the color matching function related to the stimulus value X, the stimulus value Y and the stimulus value Z and integrating the same by wavelength, the luminance of the stimulus value X, the stimulus value Y and the stimulus value Z in the observation light can be obtained. The stimulus value Y is the only stimulus value that represents brightness among the three stimulus values.

Figure 5:
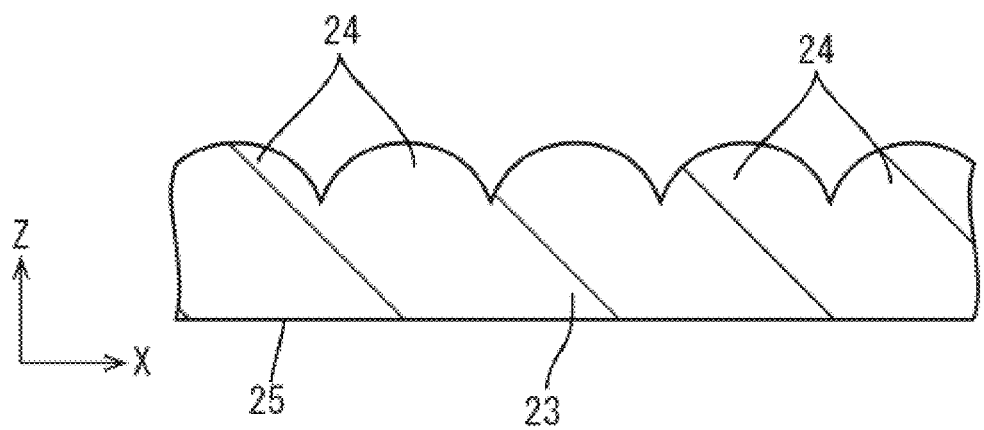
FIG. 5 is a cross-sectional view of a two-dimensional lens sheet which is a first light diffusion sheet.
Figure 6:
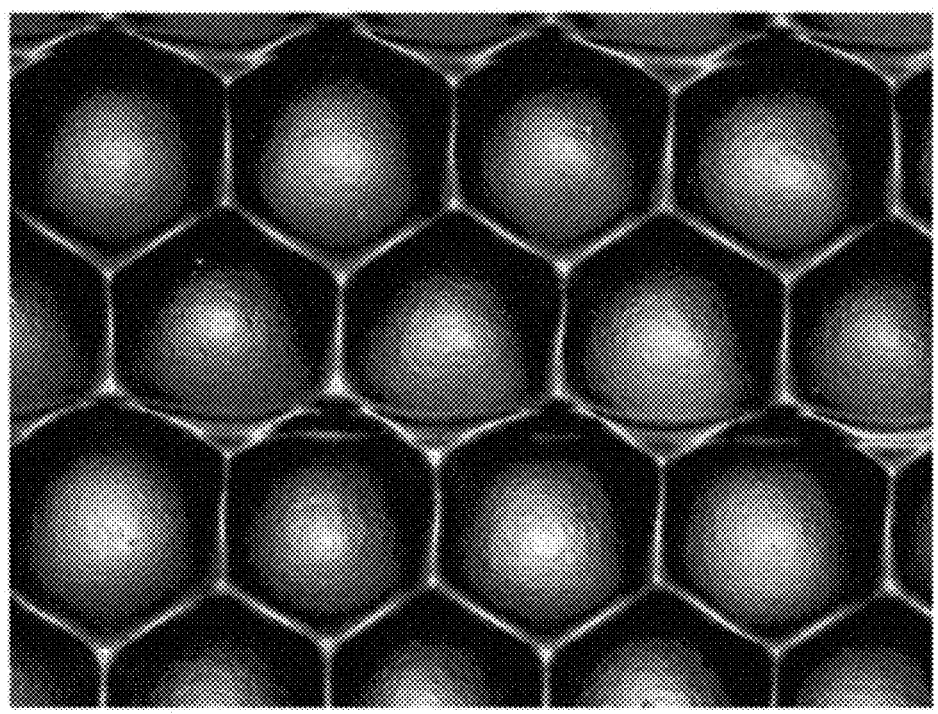
FIG. 6 is a photograph of a surface of the two-dimensional lens sheet.
Figure 7:
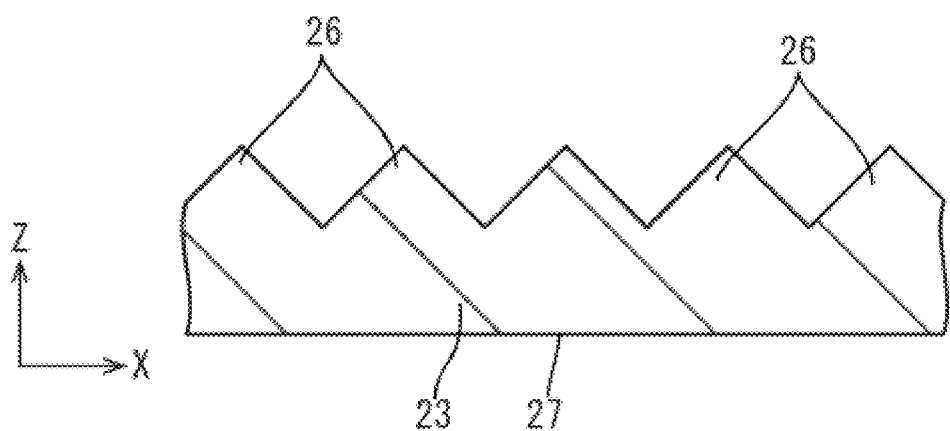
FIG. 7 is a cross-sectional view of a two-dimensional prism sheet which is a first light diffusion sheet.
Figure 8:
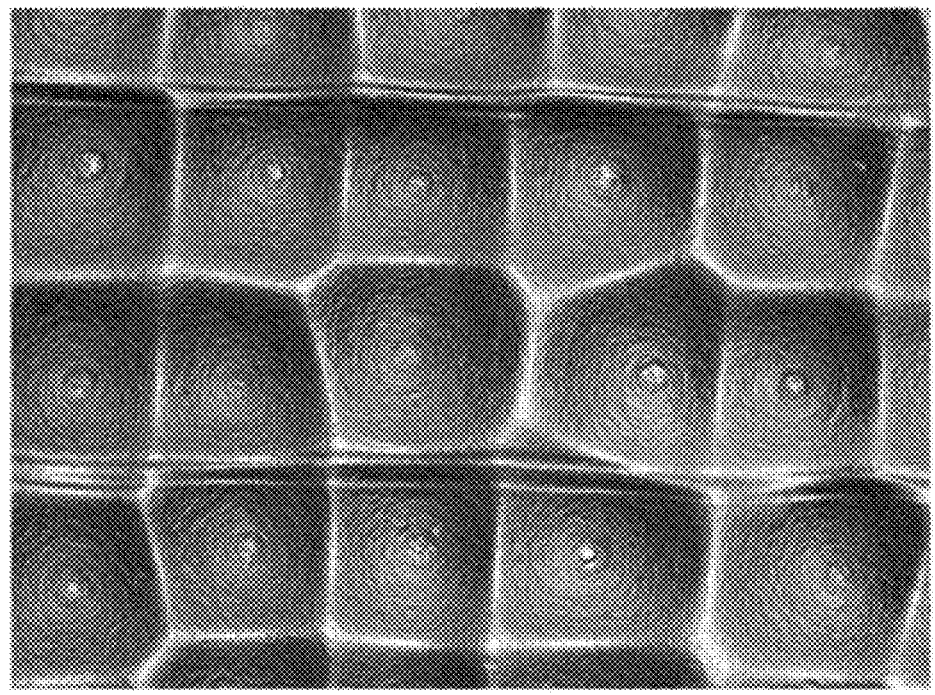
FIG. 8 is a photograph of a surface of the two-dimensional prism sheet.
Figure 9:
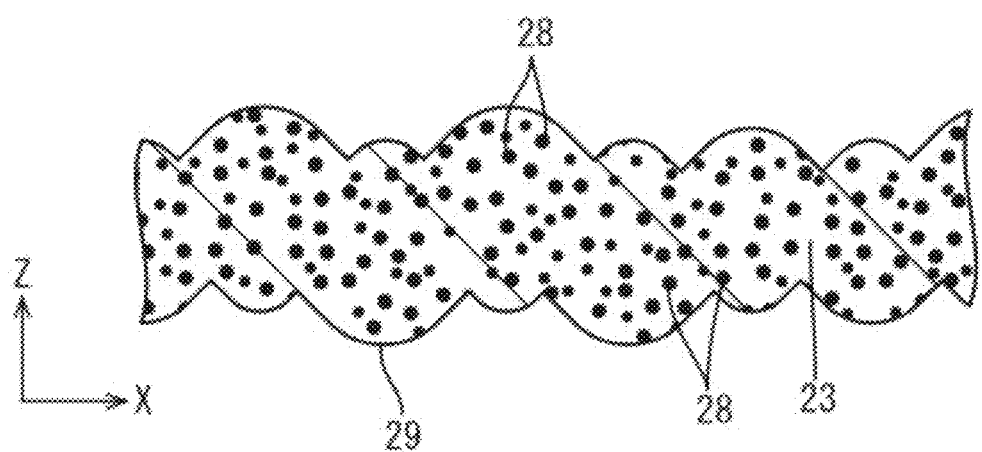
FIG. 9 is a cross-sectional view of a light scattering sheet which is a first light diffusion sheet.

The first light diffusion sheet 17 and the second light diffusion sheet 19 both have at least a substantially transparent base material 23 made of synthetic resin, and apply diffusion action to the light. In the first light diffusion sheet 17, a plurality of types in which a structure for applying the diffusion action to the light is different exist. For example, as shown in FIG. 5, the first light diffusion sheet 17 includes a two-dimensional lens sheet 25 in which a substantially semi-spherical unit lens 24 is lined in great numbers two-dimensionally within a plane of one plate surface of the base material 23. The two-dimensional lens sheet 25 is preferably arranged such that a surface not formed with the unit lens 24 faces the LED 13 side. A photograph of the surface of the two-dimensional lens sheet 25 is as shown in FIG. 6. According to FIG. 6, the unit lens 24 is hexagonal arrayed on the plate surface of the two-dimensional lens sheet 25. The unit lens 24 has a radius of for example about 30 μm, and an array pitch of for example about 70 μm. In the present embodiment, a case in which "G-GH85-PE07" manufactured by Bright View Technologies Co. is used for the two-dimensional lens sheet 25 has been illustrated, but of course, other products may be used. In addition, as shown in FIG. 7, the first light diffusion sheet 17 includes a two-dimensional prism sheet 27 in which a unit prism 26 is lined in great number two-dimensionally in a plane of one plate surface of the base material 23, the unit prism 26 having a cross-sectional view of an isosceles triangle and a stereoscopic shape of a quadrangular pyramid. The two-dimensional prism sheet 27 is preferably arranged such that the surface not formed with the unit prism 26 faces the LED 13 side. The photograph of the surface of the two-dimensional prism sheet 27 is as shown in FIG. 8. According to FIG. 8, the unit prism 26 is substantially square arrayed on the plate surface of the two-dimensional prism sheet 27. The unit prism 26 has a base angle of for example about 30 degrees and an apex angle of for example about 120 degrees. In the present embodiment, a case in which "G-GC90-PE07" manufactured by Bright View Technologies Co. is used for the two-dimensional lens sheet 25 has been illustrated, but of course, other products may be used. Furthermore, as shown in FIG. 9, the first light diffusion sheet 17 includes a light scattering sheet 29 obtained by disperse blending scattering particles 28 for scattering the light inside the base material 23. More specifically, in addition to including for example a base material 23 made of polyolefin and containing a plurality of types having different index of refraction as the scattering particles 28 in the base material 23, the light scattering sheet 29 has microscopic bumps randomly arrayed on both front and back plate surfaces. In the present embodiment, "V-H080-PP07" manufactured by Bright View Technologies is used for the light scattering sheet 29 having such a configuration, but of course, other products may be used. The first light diffusion sheet 17 includes any one selected from the two-dimensional lens sheet 25, the two-dimensional prism sheet 27 and the light scattering sheet 29. On the contrary, in addition to including for example a base material 23 made of acryl and containing a plurality of types having different index of refraction as the scattering particles 28 in the base material 23, the second light diffusion sheet 19 has microscopic bumps randomly arrayed on both front and back plate surfaces. In the present embodiment, "CLAREX DRIII C DR-60C" manufactured by Kurary Co. Ltd. is used for the second light diffusion sheet 19 having such a configuration, but of course, other products may be used. The second light diffusion sheet 19 is common with the first light diffusion sheet 17 in having a function of applying diffusion action to the light and in particular, can be said as being the same as the light scattering sheet 29 contained in the first light diffusion sheet 17.

Figure 10:
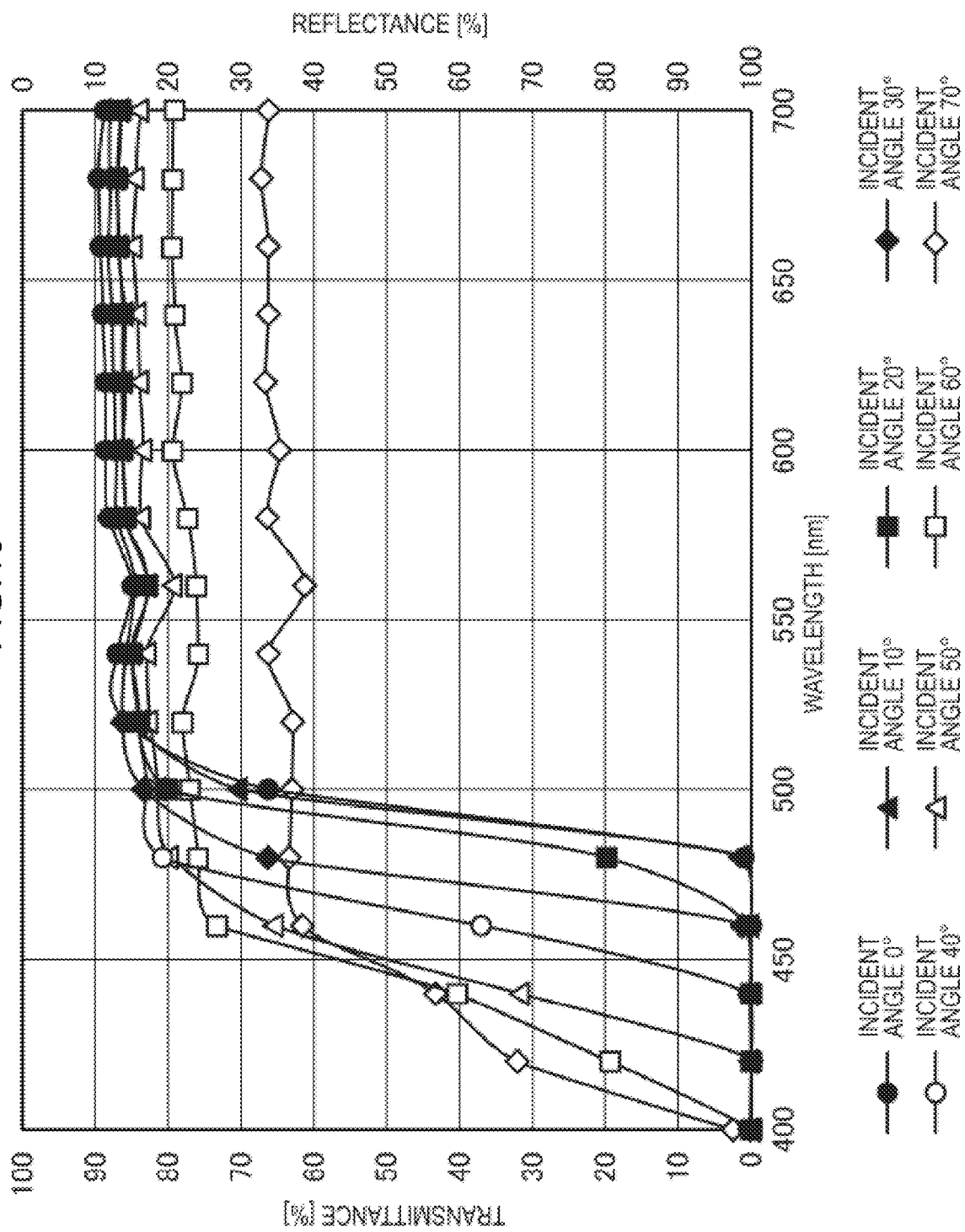
FIG. 10 is a graph showing a reflecting/transmitting spectrum for every incident angle of the light related to a blue light reflection sheet.

The blue light reflection sheet 18 has a wavelength selecting property (reflectance wavelength dependence property) of selectively reflecting the blue light of the visible light ray and substantially transmitting the green light and the red light. Furthermore, the blue light reflection sheet 18 has an angle selecting property (reflectance angle dependence property) such that the reflectance of the blue light having a small incident angle becomes higher than the reflectance of the blue light having a large incident angle. The blue light reflection sheet 18 that exhibits such optical performance includes a dielectric multi-layered film. The dielectric multi-layered film has a configuration in which a great number of dielectric layers, the index of refraction of which being minutely different, are stacked, where the dielectric layer includes for example, a PEN (polyethylene naphthalate) film having a thickness of about a few dozen or a few hundred nm. The reflecting/transmitting spectrum for every incident angle of the light related to the blue light reflection sheet 18 is as shown in FIG. 10. FIG. 10 is a graph in which the transmittance and the reflectance when the incident angle of the light is changed every 10 degrees from 0 degree to 70 degrees with respect to the blue light reflection sheet 18 having the configuration described above and the wavelength of the light is changed every predetermined wavelength from 400 nm to 700 nm are plotted. The incident angle "0 degree" means that the light is perpendicularly entering the plate surface of the blue light reflection sheet 18, and the incident angle "90 degrees" means that the light is horizontally entering the plate surface of the blue light reflection sheet 18. According to FIG. 10, the perpendicular incident light in which the incident angle is 0 degree and the light in which the incident angle is 10 degrees have a reflectance of substantially 100% (transmittance of substantially 0%) if the wavelength is less than or equal to 480 nm, and a transmittance of about 85% to 90% (reflectance of 10% to 15%) if the wavelength is greater than or equal to 520 nm. The light in which the incident angle is 20 degrees and the light in which the incident angle is 30 degrees have a reflectance of substantially 100% (transmittance of substantially 0%) if the wavelength is less than or equal to 460 nm, and a transmittance of about 80% to 90% (reflectance of 10% to 20%) if the wavelength is greater than or equal to 500 nm. The light in which the incident angle is 40 degrees has a reflectance of substantially 100% (transmittance of substantially 0%) if the wavelength is less than or equal to 435 nm, and a transmittance of about 80% to 90% (reflectance of 10% to 20%) if the wavelength is greater than or equal to 480 nm. The light in which the incident angle is 50 degrees has a reflectance of substantially 100% (transmittance of substantially 0%) if the wavelength is less than or equal to 420 nm, and a transmittance of about 80% to 90% (reflectance of 10% to 20%) if the wavelength is greater than or equal to 480 nm. The light in which the incident angle is 60 degrees and the light in which the incident angle is 70 degrees do not have a reflectance of substantially 100% (transmittance of substantially 0%) unless the wavelength is about 400 nm. Furthermore, the light in which the incident angle is 60 degrees has a transmittance of about 80% to 90% (reflectance of 10% to 20%) if the wavelength is greater than or equal to 600 nm, and the light in which the incident angle s 70 degrees has a transmittance of greater than or equal to 60% (reflectance of less than or equal to 40%) over the entire wavelength region of greater than or equal to 450 nm. According to such tendencies, the blue light reflection sheet 18 reflects the blue light in which the incident angle is 0 degree to 40 degrees (particularly 0 degree to 30 degrees) at a high reflectance of substantially greater than or equal to 80% but only reflects the blue light in which the incident angle is 50 degrees to 70 degrees at a low reflectance of substantially less than or equal to 50% and transmits the light at a transmittance of substantially greater than or equal to 50%. On the other hand, the blue light reflection sheet 18 transmits the green light and the red light in which the incident angle is 0 degree to 50 degrees at a high transmittance of substantially greater than or equal to 80% and even transmits the green light and the red light in which the incident angle is 60 degrees to 70 degrees at a transmittance of at least greater than or equal to 60%.

Figure 11:
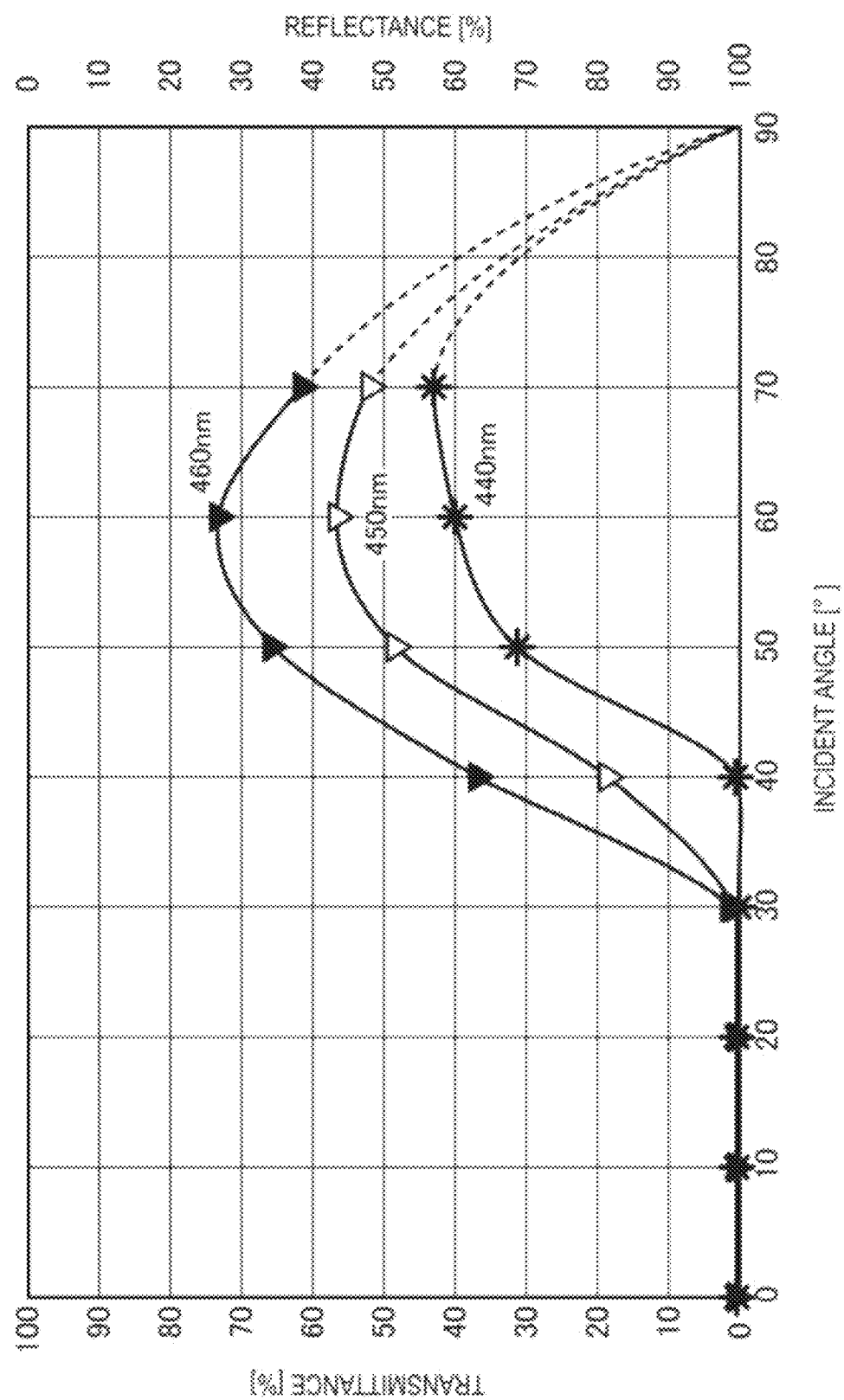
FIG. 11 is a graph showing the incident angle dependence property of the reflectance and transmittance of the blue light in the blue light reflection sheet.

Next, the incident angle dependence property of the reflectance and the transmittance of the blue light in the blue light reflection sheet 18 has the tendency shown in FIG. 11. FIG. 11 is a graph in which the transmittance and the reflectance when the incident angle of the blue light of each wavelength is changed every 10 degrees from 0 degree to 70 degrees are plotted with the wavelength of the blue light to be entered to the blue light reflection sheet 18 having the above configuration set at 440 nm, 450 nm, and 460 nm. According to FIG. 11, the blue light of each wavelength all have a reflectance of substantially 100% (transmittance of substantially 0%) when the incident angle is smaller than or equal to 30 degrees. In particular, the blue light having the shortest wavelength of 440 nm has a reflectance of substantially 100% even when the incident angle is 40 degrees. The blue light having a wavelength of 450 nm or 460 nm all tend to have the transmittance at the peak when the incident angle becomes 60 degrees, and to have the transmittance become lower (reflectance becomes higher) when the incident angle exceeds 60 degrees. Furthermore, the blue light having a wavelength of 440 nm has a transmittance at the peak when the incident angle becomes 70 degrees. The blue light of any wavelength is assumed to have a tendency in which the transmittance lowers when the incident angle exceeds 70 degrees. Comparing the blue light of each wavelength, there is a tendency that the transmittance of shorter wavelength is lower (reflectance is higher) and the transmittance of longer wavelength is higher (reflectance is lower) when the incident angle is the same. According to such tendencies, the blue light reflection sheet 18 reflects the blue light in which the incident angle is 30 degrees to smaller than or equal to 40 degrees at a reflectance close to 100%, where when the incident angle becomes larger than such, the reflectance of the blue light gradually lowers (transmittance gradually becomes higher), and when the incident angle reaches 60 degrees to 70 degrees, the reflectance of the blue light in turn becomes higher (transmittance lowers).

As shown in FIG. 1, the blue light emitted from the LED 13 and entered to the blue light reflection sheet 18 has a tendency in which the light quantity is relatively large and the incident angle thereof is small in the vicinity of the LED 13 (e.g., near immediately above the LED 13 etc.) whereas the light quantity is relatively small and the incident angle thereof is large at the periphery of the LED 13 (e.g., near the position to become the middle of the adjacent LEDs 13 etc.). Then, the blue light that exit the blue light reflection sheet 18 has one part wavelength converted to the green light and the red light by the green phosphor and the red phosphor in the wavelength conversion sheet 20 and the remaining part transmitted through the wavelength conversion sheet 20. Although the green light and the red light wavelength converted by the wavelength conversion sheet 20 are randomly diffused at the time of wavelength conversion, the blue light transmitted through the wavelength conversion sheet 20 is not subjected to such diffusion action. Thus, the exit light of the backlight device 12 tends to easily have a bluish tone in the vicinity of the LED 13 as compared to the periphery of the LED 13 and the exit light quantity tends to become large, but color unevenness and luminance unevenness may arise.

In this regards, as shown in FIG. 1, the blue light reflection sheet 18 has an angle selecting property such that the reflectance of the blue light in which the incident angle with respect to its light entering surface is small becomes higher than the reflectance of the blue light in which the incident angle is large, so that a great amount of blue light in the vicinity of the LED 13 is reflected with high reflectance and returned in great amount toward the LED 13 side but a small amount of blue light in the periphery of the LED 13 is only reflected with low reflectance and most of the remaining light is transmitted. Thus, the blue light exit from the light exit surface of the blue light reflection sheet 18 is less likely to have difference in the exit light quantity between the vicinity of the LED 13 and the periphery of the LED 13. Since the first light diffusion sheet 17 is arranged between the LED 13 in the light exit path in the backlight device 12 and the blue light reflection sheet 18, the blue light reflected by the blue light reflection sheet 18 and returned toward the LED 13 side can be suitably diffused by the first light diffusion sheet 17. At this time, a great amount of blue light is returned by the blue light reflection sheet 18 to the vicinity of the LED 13, and in particular, the light quantity returned to immediately above the LED 13 in the light exit path is the largest, but such blue light can be actively diffused by the first light diffusion sheet 17 and directed toward the peripheral side of the LED 13. Since the blue light diffused to the periphery of the LED 13 by the first light diffusion sheet 17 and again entered to the blue light reflection sheet 18 contains a large amount of light in which the incident angle with respect to the blue light reflection sheet 18 is large, and thus that which transmits the blue light reflection sheet 18 is in large amount. Therefore, a difference is less likely to occur in the exit light quantity of the blue light between the vicinity of the LED 13 and the periphery of the LED 13, the distribution related to the exit light quantity of the blue light becomes uniform, and hence the exit light of the backlight device 12 is less likely to have color unevenness such as partially having a bluish tone and luminance unevenness in which the exit light quantity becomes locally large is less likely to occur.

Furthermore, as shown in FIG. 1, the blue light reflection sheet 18 has the wavelength selecting property such that the reflectance of the blue light becomes higher than the reflectance of the green light and the red light, and thus the blue light existing in great amount in the vicinity of the LED 13 and in which the incident angle with respect to the blue light reflection sheet 18 is small is selectively reflected with a reflectance higher than the reflectance with respect to the green light and the green light. The distribution of the blue light that exit the blue light reflection sheet 18 and entered the wavelength conversion sheet 20 is thus uniformed, and thus unevenness is less likely to occur in the exit light quantity of the blue light that exits the wavelength conversion sheet 20 even if the blue light that transmits through the wavelength conversion sheet 20 is randomly diffused. Since the second light diffusion sheet 19 is arranged between the blue light reflection sheet 18 in the light exit path of the backlight device 12 and the wavelength conversion sheet 20, and thus the blue light transmitted through the blue light reflection sheet 18 and the green light and the red light wavelength converted by the wavelength conversion sheet 20 and advanced toward the LED 13 side can be diffused by the second light diffusion sheet 19. As the blue light, the green light, and the red light are more widely diffused compared to a configuration in which the wavelength conversion sheet 20 and the blue light reflection sheet 18 are directly overlapped, luminance unevenness and color unevenness are more unlikely to occur.

A first comparative experiment below was conducted to verify the superiority of the backlight device 12 including the first light diffusion sheet 17, the blue light reflection sheet 18, and the like as described above. In the first comparative experiment, the following comparative example 1, comparative examples 2A to 2C, and examples 1A to 1C were used as the backlight device, and the exit light thereof was observed using a two-dimensional chromameter. The comparative example 1 has a configuration similar to that described prior to the present paragraph other than that the first light diffusion sheet 17 is not provided. The comparative examples 2A to 2C are common in that the blue light reflection sheet 18 is not provided, where the comparative example 2A includes a two-dimensional lens sheet 25 as the first light diffusion sheet 17, the comparative example 2B includes a two-dimensional prism sheet 27 as the first light diffusion sheet 17, and the comparative example 2C includes a light scattering sheet 29 as the first light diffusion sheet 17. The comparative examples 2A to 2C have configurations similar to that described prior to the present paragraph other than that the blue light reflection sheet 18 is not provided. The examples 1A to 1C have configurations similar to that described prior to the present paragraph, where the example 1A includes a two-dimensional lens sheet 25 as the first light diffusion sheet 17, the example 1B includes a two-dimensional prism sheet 27 as the first light diffusion sheet 17, and the example 1C includes a light scattering sheet 29 as the first light diffusion sheet 17. The two-dimensional chromameter includes an X filter, a Y filter, and a Z filter having a transmitting spectrum approximate to each color matching function related to the stimulus value X, the stimulus value Y and the stimulus value Z. "CA-2000" manufactured by Konica Minolta Inc., for example, was used as the two-dimensional chromameter, and each image related to the stimulus value X, the stimulus value Y and the stimulus value Z in the exit lights of the comparative example 1, the comparative examples 2A to 2C, and the examples 1A to 1C was photographed and the average luminance thereof (unit is "$cd/m^2$") was measured. Furthermore, each photographed image was visually observed by an inspector to make determinations on color unevenness and luminance unevenness. In such determination, the presence or absence of color unevenness and luminance unevenness serve as a criteria, where determination is made as "⊚" (excellent) if there are barely any color unevenness and luminance unevenness, determination is made as "○" (good) if there are substantially no color unevenness and luminance unevenness, determination is made as "Δ" (fair) if the color unevenness and luminance unevenness slightly exist but are in a tolerable range, and determination is made as "x" (bad) if the color unevenness and luminance unevenness exist and are beyond the tolerable range. The experiment results are as shown in FIGS. 12 and 13. FIG. 12 shows the experiment results of the comparative example 1 and the comparative examples 2A to 2C, and FIG. 13 shows the experiment results of the examples 1A to 1C.

The experiment results of the first comparative experiment will be described. According to FIGS. 12 and 13, in the comparative example 1 and the comparative examples 2A to 2C, the average luminance of the stimulus value X, the stimulus value Y, and the stimulus value Z is high but determination is made that the color unevenness and the luminance unevenness exceeding the tolerable range exist by visual observation compared to the examples 1A to 1C. Specifically, in the comparative example 1 and the comparative examples 2A to 2C, a state in which bright portions, which are locally bright, are lined at a predetermined interval is visually recognized in the image related to the stimulus value Z, which interval is about the same as the arrangement interval of the LED 13. That is, in the comparative example 1 and the comparative examples 2A to 2C, the exit light quantity of the blue light is locally large in the vicinity of each LED 13 thus causing the color unevenness and luminance unevenness. On the other hand, compared to the comparative example 1 and the comparative examples 2A to 2C, in the examples 1A to 1C, the average luminance of the stimulus value X, the stimulus value Y, and the stimulus value Z is low but determination is made that the color unevenness and luminance unevenness barely exist or substantially do not exist by visual observation. Specifically, in the example 1A, the bright portion which is locally bright is barely visually recognized in the image related to the stimulus value Z, and determination is made that the color unevenness and luminance unevenness barely exist. In the examples 1B, 1C, the bright portion which is locally bright is not substantially visually recognized in the image related to the stimulus value Z, and determination is made that the color unevenness and luminance unevenness substantially do not exist. Therefore, it is assumed that the color unevenness and luminance unevenness are less likely to be visually recognized in the examples 1A to 1C in which the first light diffusion sheet 17 and the blue light reflection sheet 18 are provided as compared to the comparative example 1 and the comparative examples 2A to 2C in which either the first light diffusion sheet 17 and the blue light reflection sheet 18 is not provided.

As described above, the backlight device (lighting device) 12 of the present embodiment includes the LED (light source) 13, the blue light reflection sheet (light reflecting unit) 18, arranged on the exit side of the light exit path with respect to the LED 13 to reflect at least a part of the light emitted from the LED 13 and transmit another part and having an angle selecting property such that the reflectance of a light in which the incident angle is small becomes higher than the reflectance of a light in which the incident angle is large, and the first light diffusion sheet (light diffusing unit) 17 arranged between the LED 13 and the blue light reflection sheet 18 in the light exit path to diffuse light.

In this manner, the light emitted from the LED 13 has at least one part reflected by the blue light reflection sheet 18 arranged on the exit side of the light exit path with respect to the LED 13. The light emitted from the LED 13 and entered to the blue light reflection sheet 18 tends to be in a relatively large light quantity and has a small incident angle in the vicinity of the LED 13 but in a relatively small light quantity and has a large incident angle at the periphery of the LED 13. On the other hand, since the blue light reflection sheet 18 has an angle selecting property such that the reflectance of the light having a small incident angle with respect to the blue light reflection sheet 18 becomes higher than the reflectance of the light having a large incident angle, a large quantity of light in the vicinity of the LED 13 is reflected with high reflectance and returned toward the LED 13 side, whereas a small quantity of light at the periphery of the LED 13 is only reflected with low reflectance and most of the remaining light is transmitted through the blue light reflection sheet 18. The light reflected by the blue light reflection sheet 18 and returned toward the LED 13 side is diffused by the first light diffusion sheet 17 arranged between the LED 13 and the blue light reflection sheet 18. At this time, most of the light is returned to the vicinity of the LED 13 by the blue light reflection sheet 18, and in particular, although the light quantity of the light returned to immediately above the LED 13 on the light exit path is the largest, such light can be directed toward the peripheral side of the LED 13 by diffusing with the first light diffusion sheet 17. The light diffused to the periphery of the LED 13 by the first light diffusion sheet 17 and again entered to the blue light reflection sheet 18 contains a large quantity of light having a large incident angle with respect to the blue light reflection sheet 18, and hence the quantity of the light that transmits through the blue light reflection sheet 18 becomes large. Therefore, a difference is less likely to occur in the exit light quantity between the vicinity of the LED 13 and the periphery of the LED 13, and the occurrence of luminance unevenness is suitably suppressed.

Furthermore, the wavelength conversion sheet (wavelength conversion unit) 20 including a phosphor that wavelength converts the primary light emitted from the LED 13 and emits a secondary light is arranged on the exit side of the light exit path with respect to the LED 13. Thus, the primary light emitted from the LED 13 has one part wavelength converted to the secondary light by the phosphor of the wavelength conversion sheet 20, but another part not wavelength converted and transmitted through the wavelength conversion sheet 20. Therefore, the exit light includes the primary light and the secondary light.

In addition, a second light diffusion sheet (second light diffusing unit) 19 arranged between the blue light reflection sheet 18 and the wavelength conversion sheet 20 in the light exit path to diffuse light is provided. Thus, the primary light transmitted through or reflected by the blue light reflection sheet 18, the primary light transmitted through the wavelength conversion sheet 20, the secondary light wavelength converted by the wavelength conversion sheet 20, and the like can be diffused by the second light diffusion sheet 19. Compared to a configuration in which the wavelength conversion sheet 20 and the blue light reflection sheet 18 are directly overlapped, the primary light and the secondary light are more widely diffused, and thus the luminance unevenness and the color unevenness are more unlikely to occur.

Furthermore, the blue light reflection sheet 18 has a wavelength selecting property such that the reflectance of the primary light becomes higher than the reflectance of the secondary light. The secondary light wavelength converted by the phosphor in the wavelength conversion sheet 20 is randomly diffused at the time of wavelength conversion, but the primary light transmitted through the wavelength conversion sheet 20 is not subjected to such diffusion action. Thus, the primary light tends to exist in great quantity in the vicinity of the LED 13, which tends to become the cause of luminance unevenness and color unevenness. On the other hand, since the blue light reflection sheet 18 has a wavelength selecting property such that the reflectance of the primary light becomes higher than the reflectance of the secondary light, the primary light having a small incident angle with respect to the blue light reflection sheet 18 and existing in great quantity in the vicinity of the LED 13 can be selectively reflected with high reflectance. Thus, the primary light can be diffused to the periphery of the LED 13, and the occurrence of luminance unevenness and color unevenness can be more suitably suppressed.

Moreover, the wavelength conversion sheet 20 is arranged on the exit side with respect to the blue light reflection sheet 18 in the light exit path. Thus, in the primary light emitted from the LED 13, the light having a small incident angle is reflected with high reflectance and returned toward the LED 13 side by the blue light reflection sheet 18 having the angle selecting property before reaching the wavelength conversion sheet 20. Thus, unevenness is less likely to occur in the light quantity distribution of the primary light supplied to the wavelength conversion sheet 20, and hence luminance unevenness and color unevenness are more unlikely to occur.

The liquid crystal display device (display device) 10 of the present embodiment includes the backlight device 12 described above, and the liquid crystal panel (display panel) 11 for displaying images using the light irradiated from the backlight device 12. According to such a liquid crystal display device 10, excellent display quality is obtained since luminance unevenness is unlikely to occur in the exit light of the backlight device 12.

Second Embodiment

A second embodiment will be described with reference to FIGS. 14 to 16. In the second embodiment, that in which the green light and red light reflection sheets (second light reflecting unit) 30 is added is shown. Redundant description on the structures, operations, and effects similar to the first embodiment will be omitted.

Figure 14:
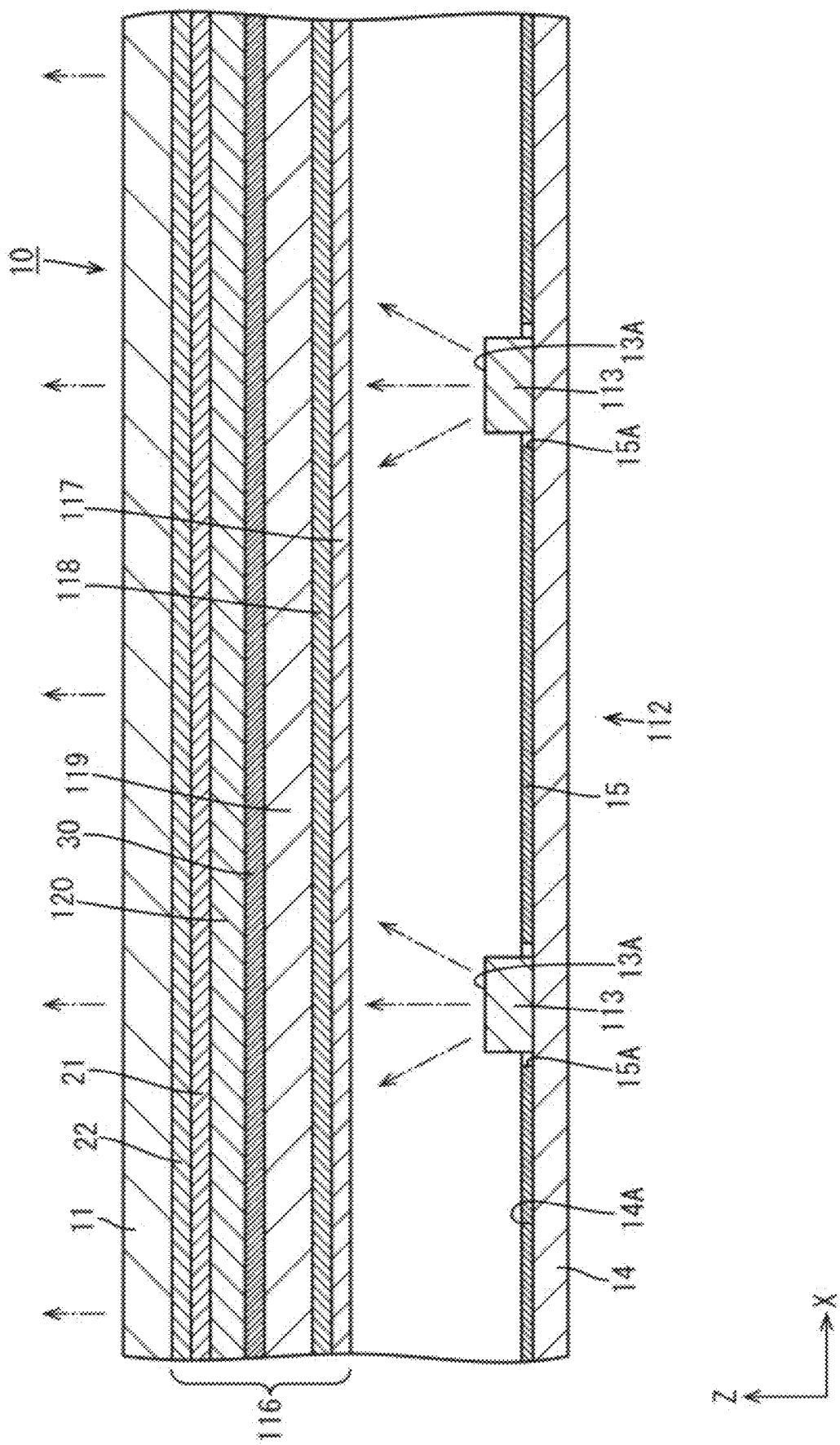
FIG. 14 is a cross-sectional view of a liquid crystal display device according to a second embodiment.

As shown in FIG. 14, the green light and red light reflection sheet 30 is added to the optical sheet 116 arranged in the backlight device 112 according to the present embodiment. The green light and red light reflection sheet 30 is interposed between the second light diffusion sheet 119 and the wavelength conversion sheet 120 in the light exit path of the backlight device 112. The green light and red light reflection sheet 30 is arranged on the LED 113 side than the wavelength conversion sheet 120 in the light exit path, and can be said as being arranged on the exit side (side opposite to the LED 113 side) of the light exit path than the blue light reflection sheet 118. The green light and red light reflection sheet 30 has a wavelength selecting property (reflectance wavelength dependence property) that selectively reflects the green light and the red light of the visible light ray and substantially transmits the blue light. Furthermore, the green light and red light reflection sheet has an angle selecting property (reflectance angle dependence property) such that the reflectance of the green light and the red light having a large incident angle becomes higher than the reflectance of the green light and the red light having a small incident angle. The green light and red light reflection sheet 30 includes a dielectric multi-layered film in order to exhibit such optical performance. Such dielectric multi-layered film has a configuration in which a dielectric layers in which the index of refraction differs microscopically are stacked in great numbers, and the dielectric layer includes a PEN (polyethylene naphtalate) film having a thickness of, for example, about a few dozen or a few hundred nm.

Figure 15:
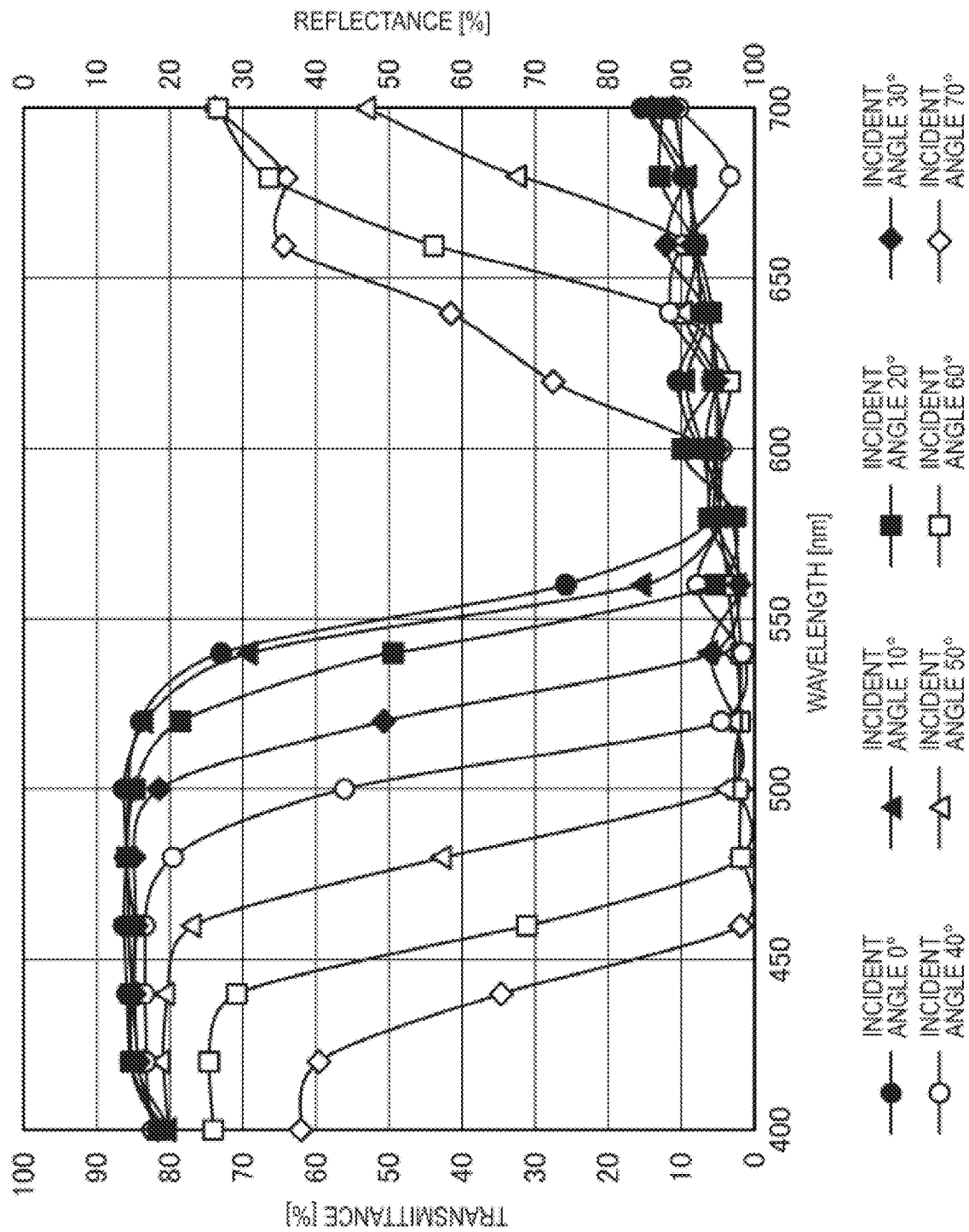
FIG. 15 is a graph showing a reflecting/transmitting spectrum for every incident angle of the light related to a green light and red light reflection sheet.

The reflecting/transmitting spectrum for every incident angle of the light reflected to the green light and red light reflection sheet 30 is as shown in FIG. 15. FIG. 15 is a graph in which the transmittance and reflectance when the incident angle of the light with respect to the green light and red light reflection sheet 30 having the above configuration is changed for every 10 degrees from 0 degree to 70 degrees and the wavelength of the light is changed for every predetermined wavelength from 400 nm to 700 nm are plotted. Here, the absorptance of the light is assumed as 0%. Furthermore, the incident angle "0 degree" means that the light perpendicularly enters the plate surface of the green light and the red light reflection sheet 30, and the incident angle "90 degrees" means that the light horizontally enters the plate surface of the green light and red light reflection sheet 30. According to FIG. 15, the perpendicularly entering light in which the incident angle is 0 degree and the light in which the incident angle is 10 degrees have a reflectance of about 90% to 95% (transmittance of about 5% to 10%) when the wavelength is substantially greater than or equal to 580 nm, and a transmittance of about 80% to 90% (reflectance of 10% to 20%) when the wavelength is substantially less than or equal to 530 nm. The lower limit value of the wavelength at which the reflectance becomes greater than or equal to 90% is substantially 560 nm for the light in which the incident angle is 20 degrees, substantially 540 nm for light in which the incident angle is 30 degrees, substantially 520 nm for light in which the incident angle is 40 degrees, substantially 500 nm for light in which the incident angle is 50 degrees, substantially 480 nm for light in which the incident angle is 60 degrees, and substantially 460 nm for light in which the incident angle is 70 degrees. On the other hand, the upper limit value of the wavelength at which the transmittance becomes greater than or equal to 80% is substantially 520 nm for the light in which the incident angle is 20 degrees, substantially 500 nm for light in which the incident angle is 30 degrees, substantially 480 nm for light in which the incident angle is 40 degrees, and substantially 450 nm for light in which the incident angle is 50 degrees. The transmittance does not become greater than or equal to 80% for light in which the incident angle is 60 degrees and for light in which the incident angle is 70 degrees. For the light in which the incident angle is 50 degrees, the reflectance rapidly decreases (transmittance rapidly increases) when the wavelength exceeds substantially 660 nm, and the reflectance becomes lower than 70% (transmittance becomes greater than 30%) when the wavelength exceeds substantially 680 nm. Similarly, for the light in which the incident angle is 60 degrees, the reflectance rapidly decreases when the wavelength exceeds substantially 640 nm, and the reflectance becomes lower than 70% when the wavelength exceeds substantially 650 nm. For the light in which the incident angle is 70 degrees, the reflectance rapidly decreases when the wavelength exceeds substantially 600 nm, and the reflectance becomes lower than 70% when the wavelength exceeds substantially 625 nm. According to such tendencies, the green light and red light reflection sheet 30 reflects the green light and the red light in which the incident angle is 0 degree to 50 degrees with high reflectance of greater than or equal to substantially 90%, reflects the green light in which the incident angle is 60 degrees to 70 degrees with high reflectance of greater than or equal to substantially 90% but reflects the red light with low reflectance of less than or equal to substantially 70% and transmits such light with transmittance of greater than or equal to substantially 30%. The green light and red light reflection sheet 30 transmits the blue light in which the incident angle is 0 degree to 30 degrees with high transmittance of greater than or equal to substantially 80%, where the blue light in which the incident angle is 40 degrees to 70 degrees has a transmittance of not greater than substantially 80% and in particular the blue light in which the incident angle is 60 degrees to 70 degrees has a transmittance of less than or equal to substantially 50%.

As shown in FIG. 14, the green light and red light reflection sheet 30 having such optical performance is arranged on the LED 113 side with respect to the wavelength conversion sheet 120 in the light exit path in the backlight device 112, and thus even if a part of the green light and red light randomly diffused when wavelength converted by the green phosphor and the red phosphor in the wavelength conversion sheet 120 is returned toward the LED 113 side, the light advances toward the exit side of the light exit path by being reflected by the green light and red light reflection sheet 30. Thus, the utilization efficiency of the green light and the red light enhances and an effect of higher luminance is obtained. Furthermore, since the green light and red light reflection sheet 30 has an angle selecting property such that the reflectance of the green light and red light having a small incident angle becomes higher than the reflectance of the green light and red light having a large incident angle, it is useful when unevenness occurs in the light quantity distribution of the green light and the red light wavelength converted in the wavelength conversion sheet 120. In other words, among the green light and the red light advancing toward the LED 113 side from the wavelength conversion sheet 120, the green light and the red light having a small incident angle with respect to the green light and red light reflection sheet 30 is greatly reflected by the green light and red light reflection sheet 30 than the green light and the red light having a large incident angle, and hence unevenness that may occur in the light quantity distribution of the green light and the red light can be alleviated. Thus, luminance unevenness and color unevenness are less likely to occur for the green light and the red light.

A second comparative experiment below was conducted to verify the superiority of the backlight device 112 including the green light and red light reflection sheet 30, and the like as described above. In the second comparative experiment, the following comparative example 3 and examples 2A to 2C were used as the backlight device, and the exit light thereof was observed using a two-dimensional chromameter. The comparative example 3 has a configuration similar to that described prior to the present paragraph other than that the first light diffusion sheet 117 is not provided. The examples 2A to 2C have configurations similar to that described prior to the present paragraph, where the example 2A includes a two-dimensional lens sheet as the first light diffusion sheet 117 (see FIGS. 5 and 6), the example 2B includes a two-dimensional prism sheet as the first light diffusion sheet 117 (see FIGS. 7 and 8), and the example 2C includes a light scattering sheet as the first light diffusion sheet 117 (see FIG. 9). The two-dimensional chromameter used in the observation and the observation contents are the same as those described in the first comparative experiment of the first embodiment. The experiment results are as shown in FIG. 16. Similar to FIGS. 12 and 13, an image photographed with the two-dimensional chromameter, the average luminance measured by the two-dimensional chromameter, and the determination result by visual inspection of a judgement staff are described in the table of FIG. 16.

The experiment results of the second comparative experiment will be described. According to FIG. 16, in the comparative example 3, color unevenness and luminance unevenness exceeding the tolerable range are determined to exist by visual observation compared to the examples 2A to 2C. Specifically, in the comparative example 3, a state in which bright portions which are locally bright are arranged at predetermined intervals is visually recognized in the image related to the stimulus value Z, which interval is about the same as the arrangement interval of the LEDs 13. That is, in the comparative example 3, it is found that the exit light quantity of the blue light is locally large in the vicinity of each LED 113 thus causing color unevenness and luminance unevenness. In the examples 2A to 2C, on the other hand, compared to the comparative example 3, it is determined by visual inspection that the color unevenness and luminance unevenness substantially do not exist or even if the color unevenness and luminance unevenness do exist it is to an extent they do not exceed the tolerable range. Specifically, in the examples 2A and 2B, the bright portions which are locally bright are substantially not visually recognized in the image related to the stimulus value Z, and it is determined that the color unevenness and luminance unevenness substantially do not exist. In the example 2C, the bright portions which are locally bright are slightly visually recognized in the image related to the stimulus value Z, but it is determined that the color unevenness and the luminance unevenness are within the tolerable range. Furthermore, the experiment results of the examples 2A to 2C are compared with the experiment results (see FIG. 13) of the examples 1A to 1C according to the first comparative experiment of the first embodiment. Compared to the examples 1A to 1C, in the examples 2A to 2C, although not such good results are obtained for the color unevenness and the luminance unevenness, the average luminance of the stimulus value X and the stimulus value Y are both higher. In the examples 2A to 2C, this is assumed to be the influence of enhancement in the utilization efficiency of the green light and the red light by the green light and red light reflection sheet 30.

As described above, according to the present embodiment, the green light and red light reflection sheet (second light reflecting unit) 30 arranged on the LED 113 side with respect to the wavelength conversion sheet 120 in the light exit path and having a wavelength selecting property to reflect at least a part of the light and transmit another part of the light and to have the reflectance of the secondary light higher than the reflectance of the primary light. The secondary light wavelength converted by the phosphor in the wavelength conversion sheet 120 is randomly diffused at the time of wavelength conversion, and thus has one part thereof returned to the LED 113 side. One part of the secondary light returned to the LED 113 side from the wavelength conversion sheet 120 advances toward the side opposite to the LED 113 side by being reflected by the green light and red light reflection sheet 30, and then exit to the outside. The luminance thus can be enhanced.

Furthermore, the green light and red light reflection sheet 30 has an angle selecting property such that the reflectance of the secondary light having a small incident angle becomes higher than the reflectance of the secondary light having a large incident angle. Thus, even if unevenness occurs in the light quantity distribution of the secondary light wavelength converted by the wavelength conversion sheet 120, a large quantity of the secondary light having a small incident angle with respect to the green light and red light reflection sheet 30 is reflected by the green light and red light reflection sheet 30 than the secondary light having a large incident angle among the secondary light advancing from the wavelength conversion sheet 120 toward the LED 113, and hence the unevenness that may occur in the light quantity distribution of the secondary light can be alleviated. Thus, luminance unevenness and color unevenness are less likely to occur.

Furthermore, the wavelength conversion sheet 120 and the green light and red light reflection sheet 30 are arranged on the exit side with respect to the blue light reflection sheet 118 in the light exit path. Thus, the primary light emitted from the LED 113 having a small incident angle is reflected with high reflectance toward the LED 113 side by the blue light reflection sheet 118 having the angle selecting property, so that unevenness is less likely to occur in the light quantity distribution of the primary light. When the primary light is transmitted through the green light and red light reflection sheet 30 and reaches the wavelength conversion sheet 120, one part is wavelength converted to the secondary light by the phosphor. The secondary light advancing from the wavelength conversion sheet 120 to the LED 113 side having a small incident angle is reflected with high reflectance by the green light and red light reflection sheet 30 having the angle selecting property. Therefore, luminance unevenness and color unevenness are less likely to occur.

Furthermore, the second light diffusion sheet 119 arranged between the blue light reflection sheet 118 and the green light and red light reflection sheet 30 in the light exit path to diffuse light is provided. Thus, the primary light transmitted through the blue light reflection sheet 118, the secondary light wavelength converted by the wavelength conversion sheet 120 and returned to the LED 113 side and transmitted through the green light and red light reflection sheet 30, and the like can be diffused by the second light diffusion sheet 119. The primary light diffused by the second light diffusion sheet 119 is eventually wavelength converted to the secondary light by the wavelength conversion sheet 120, and a part of the secondary light diffused by the second light diffusion sheet 119 is exit to the outside without being returned to the LED 113 side. Therefore, compared to a configuration in which the blue light reflection sheet 118 and the green light and red light reflection sheet 30 are directly overlapped, the utilization efficiency of the light is improved and the luminance is enhanced.

Third Embodiment

A third embodiment will be described with reference to FIG. 17 or 18. In the third embodiment, the stacking order of a second light diffusion sheet 219 and a wavelength conversion sheet 220 is changed from the first embodiment. Redundant description on the structures, operations, and effects similar to the first embodiment described above will be omitted.

Figure 17:
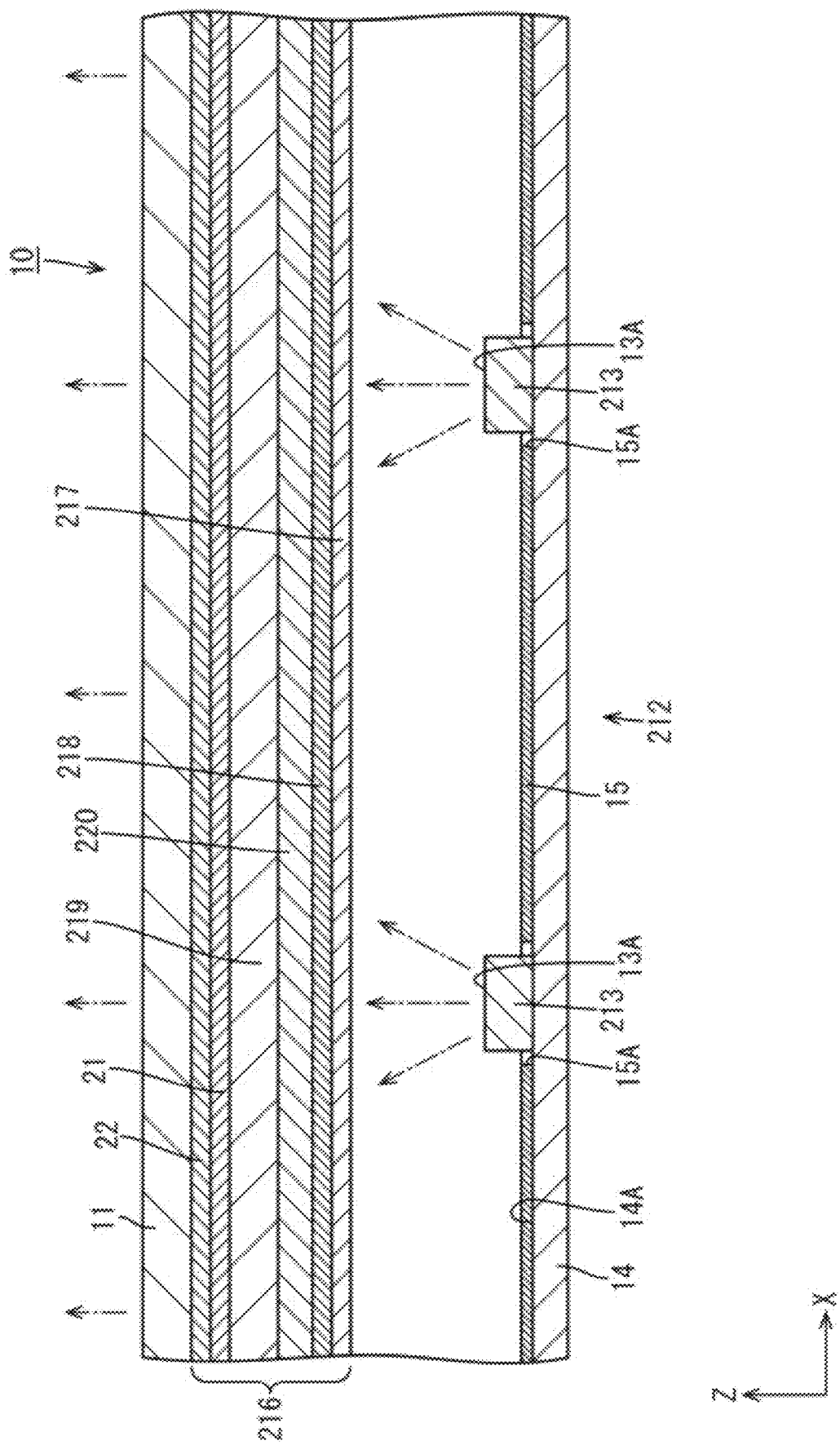
FIG. 17 is a cross-sectional view of a liquid crystal display device according to a third embodiment.

As shown in FIG. 17, an optical sheet 216 arranged in the backlight device 212 according to the present embodiment has the wavelength conversion sheet 220 stacked on the front side of the blue light reflection sheet 218, and the second light diffusion sheet 219 stacked on the front side of the wavelength conversion sheet 220. That is, the blue light reflection sheet 218 and the wavelength conversion sheet 220 are sandwiched between the first light diffusion sheet 217 and the second light diffusion sheet 219.

A third comparative experiment below was conducted to verify the superiority of the backlight device 212 in which the wavelength conversion sheet 220 arranged as above includes the blue light reflection sheet 218, and the like as described above. In the third comparative experiment, the following comparative example 4 and examples 3A to 3C were used as the backlight device, and the exit light thereof was observed using a two-dimensional chromameter. The comparative example 4 has a configuration similar to that described prior to the present paragraph other than that the first light diffusion sheet 217 is not provided. The examples 3A to 3C have configurations similar to that described prior to the present paragraph, where the example 3A includes a two-dimensional lens sheet as the first light diffusion sheet 217 (see FIGS. 5 and 6), the example 3B includes a two-dimensional prism sheet as the first light diffusion sheet 217 (see FIGS. 7 and 8), and the example 3C includes a light scattering sheet as the first light diffusion sheet 217 (see FIG. 9). The two-dimensional chromameter used in the observation and the observation contents are the same as those described in the first comparative experiment of the first embodiment. The experiment results are as shown in FIG. 18. Similar to FIGS. 12 and 13, an image photographed with the two-dimensional chromameter, the average luminance measured by the two-dimensional chromameter, and the determination result by visual inspection of a judgement staff are described in the table of FIG. 18.

The experiment results of the third comparative experiment will be described. According to FIG. 18, in the comparative example 4, color unevenness and luminance unevenness exceeding the tolerable range are determined to exist by visual observation compared to the examples 3A to 3C. Specifically, in the comparative example 4, a state in which bright portions which are locally bright are arranged at predetermined intervals is visually recognized in the image related to the stimulus value Z, which interval is about the same as the arrangement interval of the LEDs 213. That is, in the comparative example 4, it is found that the exit light quantity of the blue light is locally large in the vicinity of each LED 213 thus causing color unevenness and luminance unevenness. In the examples 3A to 3C, on the other hand, compared to the comparative example 4, it is determined by visual inspection that the color unevenness and luminance unevenness substantially do not exist or even if the color unevenness and luminance unevenness do exist it is to an extent they do not exceed the tolerable range. Specifically, in the example 3A, the bright portions which are locally bright are substantially not visually recognized in the image related to the stimulus value Z, and it is determined that the color unevenness and luminance unevenness substantially do not exist. In the example 3B, the bright portions which are locally bright are slightly visually recognized in the image related to the stimulus value Z, but it is determined that the color unevenness and the luminance unevenness are within the tolerable range. Furthermore, in the example 3C, the bright portions which are locally bright are barely visually recognized in the image related to the stimulus value Z, and it is determined that the color unevenness and the luminance unevenness barely exist. Moreover, the experiment results of the examples 3A to 3C are compared with the experiment results (see FIG. 16) of the examples 2A to 2C according to the second comparative experiment of the second embodiment. Compared to the examples 2A to 2C, in the examples 3A to 3C, the color unevenness and the luminance unevenness are the same or greater, and furthermore, the average luminance of the stimulus value X and the stimulus value Y are both higher. In a case where a configuration in which the green light and red light reflection sheet 30 included in the examples 2A to 2C is added between the wavelength conversion sheet 220 and the blue light reflection sheet 218 in the examples 3A to 3C is adopted, the blue light reflection sheet 218 and the green light and red light reflection sheet 30 are continuously overlapped, and hence it is assumed that the possibility the luminance enhancing effects may not be sufficiently obtained is high.

Fourth Embodiment

A fourth embodiment will be described with reference to FIG. 19 or FIG. 20. In the fourth embodiment the arrangement of a second light diffusion sheet 319 is changed from the first embodiment described above. Redundant description on the structures, operations and effects similar to the first embodiment described above will be omitted.

Figure 19:
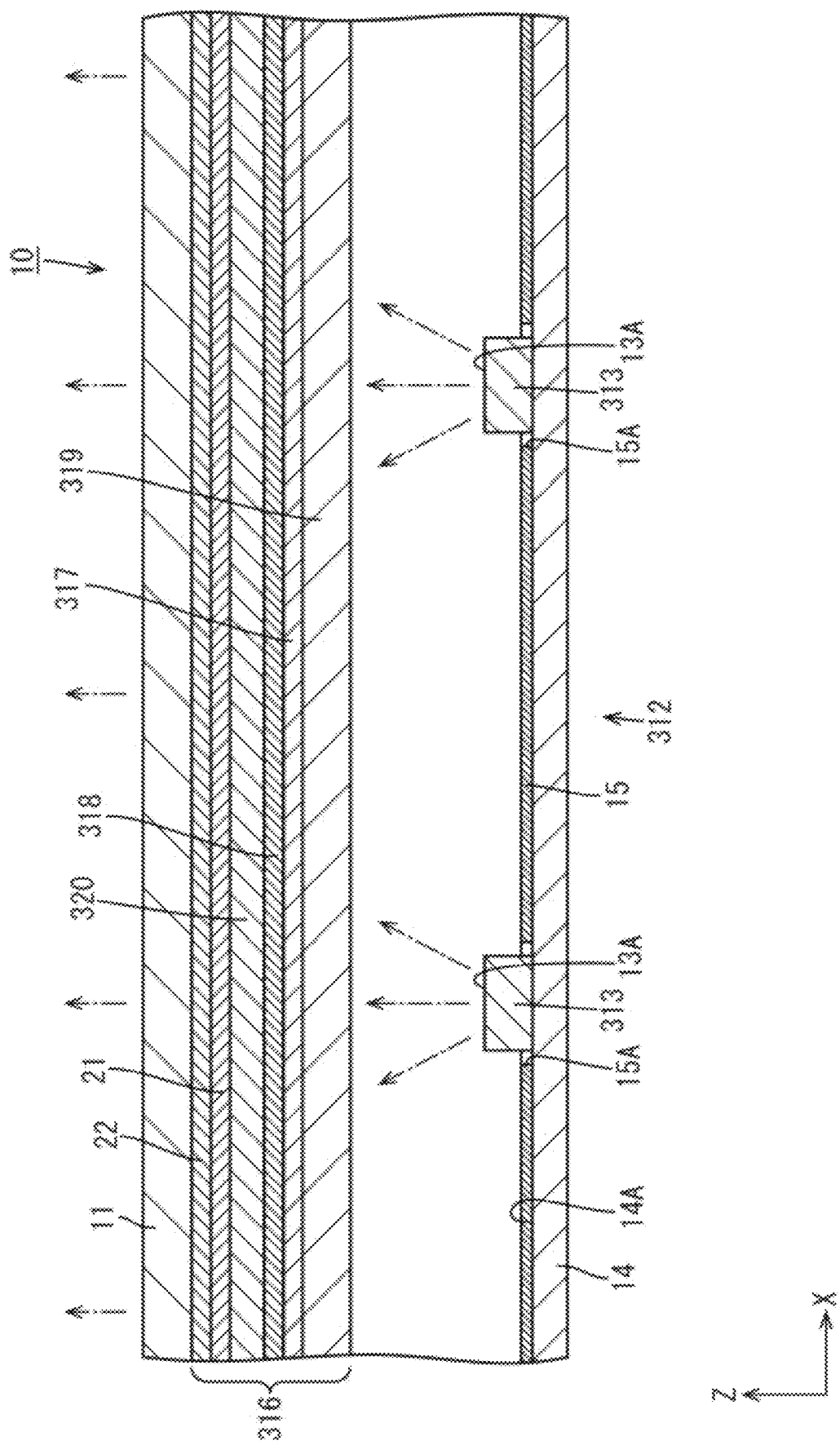
FIG. 19 is a cross-sectional view of a liquid crystal display device according to a fourth embodiment.

As shown in FIG. 19, an optical sheet 316 arranged in a backlight device 312 according to the present embodiment has a stacked order in which the second light diffusion sheet 319 is stacked on the back side of the first light diffusion sheet 317, that is, on the LED 313 side of the light exit path. The first light diffusion sheet 317 and the second light diffusion sheet 319 are stacked so as to be continuously stacked on the front and back. The first light diffusion sheet 317 and the second light diffusion sheet 319 are common in that they have a function of imparting diffusion action on the light, and thus the first light diffusion sheet 317 (second light diffusion sheet 319) is substantially stacked so that two of such sheets are continuously overlapped. Thus, the light reflected by the blue light reflection sheet 318 and returned toward the LED 313 side can be diffused by the first light diffusion sheet 317 and the second light diffusion sheet 319 arranged to overlap each other between the LED 313 and the blue light reflection sheet 318, so that occurrence of luminance unevenness is more suitably suppressed.

A fourth comparative experiment below was conducted to verify the superiority of the backlight device 312 including the first light diffusion sheet 317, the second light diffusion sheet 319, and the like stacked as described above. In the fourth comparative experiment, the following comparative example 5 and examples 4A to 4C were used as the backlight device, and the exit light thereof was observed using a two-dimensional chromameter. The comparative example 5 has a configuration similar to that described prior to the present paragraph other than that the first light diffusion sheet 317 is not provided. The examples 4A to 4C have configurations similar to that described prior to the present paragraph, where the example 4A includes a two-dimensional lens sheet as the first light diffusion sheet 317 (see FIGS. 5 and 6), the example 4B includes a two-dimensional prism sheet as the first light diffusion sheet 317 (see FIGS. 7 and 8), and the example 4C includes a light scattering sheet as the first light diffusion sheet 317 (see FIG. 9). The two-dimensional chromameter used in the observation and the observation contents are the same as those described in the first comparative experiment of the first embodiment. The experiment results are as shown in FIG. 20. Similar to FIGS. 12 and 13, an image photographed with the two-dimensional chromameter, the average luminance measured by the two-dimensional chromameter, and the determination result by visual inspection of a judgement staff are described in the table of FIG. 20.

The experiment results of the fourth comparative experiment will be described. According to FIG. 20, in the comparative example 5, color unevenness and luminance unevenness exceeding the tolerable range are determined to exist by visual observation compared to the examples 4A to 4C. Specifically, in the comparative example 5, a state in which bright portions which are locally bright are arranged at predetermined intervals is visually recognized in the image related to the stimulus value Z, which interval is about the same as the arrangement interval of the LEDs 313. That is, in the comparative example 5, it is found that the exit light quantity of the blue light is locally large in the vicinity of each LED 313 thus causing color unevenness and luminance unevenness. In the examples 4A to 4C, on the other hand, compared to the comparative example 5, it is determined by visual inspection that the color unevenness and luminance unevenness substantially do not exist or even if the color unevenness and luminance unevenness do exist it is to an extent they do not exceed the tolerable range. Specifically, in the examples 4A and 4B, the bright portions which are locally bright are substantially not visually recognized in the image related to the stimulus value Z, and it is determined that the color unevenness and luminance unevenness substantially do not exist. In the example 4C, the bright portions which are locally bright are slightly visually recognized in the image related to the stimulus value Z, but it is determined that the color unevenness and the luminance unevenness are within the tolerable range. Furthermore, in the examples 4A to 4C, the wavelength conversion sheet 320 and the blue light reflection sheet 318 are continuously overlapped, and thus in a case where a configuration in which the green light and red light reflection sheet 30 described in the second embodiment is added between the wavelength conversion sheet 320 and the blue light reflection sheet 318 is adopted, the blue light reflection sheet 318 and the green light and red light reflection sheet 30 are continuously overlapped, and hence it is assumed that the possibility the luminance enhancing effects may not be sufficiently obtained is high.

According to the present embodiment described above, the second light diffusion sheet 319 arranged to overlap the first light diffusion sheet 317 to diffuse light is provided. Thus, the light reflected by the blue light reflection sheet 318 and returned toward the LED 313 side can be diffused by the first light diffusion sheet 317 and the second light diffusion sheet 319 arranged to overlap each other between the LED 313 and the blue light reflection sheet 318. Thus, the occurrence of the luminance unevenness is more suitably suppressed.

Fifth Embodiment

A fifth embodiment will be described with reference to FIG. 21 or FIG. 22. In the fifth embodiment the arrangement of a wavelength conversion sheet 420 is changed from the first embodiment described above. Redundant description on the structures, operations and effects similar to the first embodiment described above will be omitted.

Figure 21:
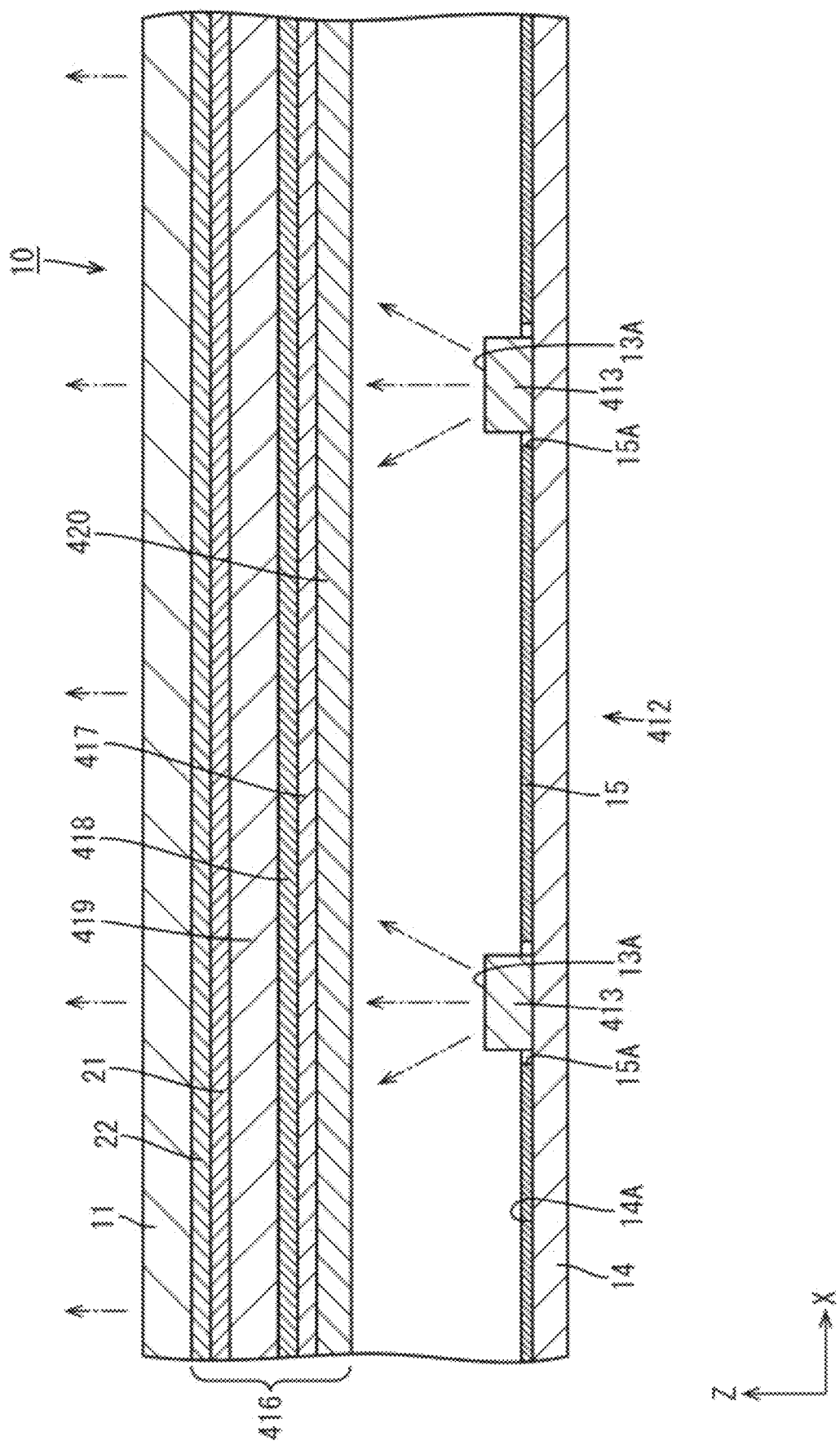
FIG. 21 is a cross-sectional view of a liquid crystal display device according to a fifth embodiment.

As shown in FIG. 21, an optical sheet 416 arranged in a backlight device 412 according to the present embodiment has a stacked order in which the wavelength conversion sheet 420 is stacked on the back side of the first light diffusion sheet 417, that is, on the LED 413 side of the light exit path. The wavelength conversion sheet 420 is disposed closest to the LED 413 in the optical sheet 416, and is disposed on the LED 413 side than the blue light reflection sheet 418. Therefore, the blue light emitted from the LED 413 is first wavelength converted to the greenlight and the red light by the wavelength conversion sheet 420. The blue light transmitted without being wavelength converted in the wavelength conversion sheet 420 having a small incident angle is reflected with high reflectance by the blue light reflection sheet 418 having the angle selecting property and returned toward the LED 413. The blue light returned to the LED 413 side is re-entered to the wavelength conversion sheet 420 and at least one part is wavelength converted to the green light and the red light thereat. The blue light is thus efficiently wavelength converted to the green light and the red light by the wavelength conversion sheet 420, which is suitable in enhancing luminance. Furthermore, since the second light diffusion sheet 419 is stacked on the front side of the blue light reflection sheet 418, the blue light transmitted through the blue light reflection sheet 418 is diffused with the second light diffusion sheet 419 so that the occurrence of the luminance unevenness and the color unevenness is suppressed.

A fifth comparative experiment below was conducted to verify the superiority of the backlight device 412 including the wavelength conversion sheet 420, and the like disposed as described above. In the fifth comparative experiment, the following comparative example 6 and examples 5A to 5C were used as the backlight device, and the exit light thereof was observed using a two-dimensional chromameter. The comparative example 6 has a configuration similar to that described prior to the present paragraph other than that the first light diffusion sheet 417 is not provided. The examples 5A to 5C have configurations similar to that described prior to the present paragraph, where the example 5A includes a two-dimensional lens sheet as the first light diffusion sheet 417 (see FIGS. 5 and 6), the example 5B includes a two-dimensional prism sheet as the first light diffusion sheet 417 (see FIGS. 7 and 8), and the example 5C includes a light scattering sheet as the first light diffusion sheet 417 (see FIG. 9). The two-dimensional chromameter used in the observation and the observation contents are the same as those described in the first comparative experiment of the first embodiment. The experiment results are as shown in FIG. 22. Similar to FIGS. 12 and 13, an image photographed with the two-dimensional chromameter, the average luminance measured by the two-dimensional chromameter, and the determination result by visual inspection of a judgement staff are described in the table of FIG. 22.

The experiment results of the fifth comparative experiment will be described. According to FIG. 22, in the comparative example 6, color unevenness and luminance unevenness exceeding the tolerable range are determined to exist by visual observation compared to the examples 5A to 5C. Specifically, in the comparative example 6, a state in which bright portions which are locally bright are arranged at predetermined intervals is visually recognized in the image related to the stimulus value Z, which interval is about the same as the arrangement interval of the LEDs 413. That is, in the comparative example 6, it is found that the exit light quantity of the blue light is locally large in the vicinity of each LED 413 thus causing color unevenness and luminance unevenness. In the examples 5A to 5C, on the other hand, compared to the comparative example 5, the color unevenness and luminance unevenness are substantially not visually recognized by visual inspection in the image related to the stimulus value Z and it is determined that the color unevenness and luminance unevenness substantially do not exist. The experiment results of the examples 5A to 5C are compared with the experiment results of the examples 1A to 1C, 2A to 2C, 3A to 3C, and 4A to 4C (see FIGS. 13, 16, 18, 20) according to the first to fourth comparative experiments of the first to fourth embodiments described above. Compared to the examples 1A to 1C, 2A to 2C, 3A to 3C and 4A to 4C, in the examples 5A to 5C, the average luminance of the stimulus value X and the stimulus value Y are both the highest. This is assumed to be the influence of enhancement in the efficiency of wavelength conversion and increase in the light quantity of the green light and the red light as, in the examples 5A to 5C, the wavelength conversion sheet 420 also wavelength converts the blue light reflected by the blue light reflection sheet 418 and returned to the LED 413 side in addition to wavelength converting the blue light directly entered from the LED 413.

According to the present embodiment described above, the wavelength conversion sheet 420 is arranged on the LED 413 side with respect to the blue light reflection sheet 418 in the light exit path. Thus, the primary light emitted from the LED 413 is first wavelength converted to the secondary light in the wavelength conversion sheet 420. The primary light transmitted through the wavelength conversion sheet 420 without being wavelength converted by the wavelength conversion sheet 420 and having a small incident angle is reflected with high reflectance by the blue light reflection sheet 418 having an angle selecting property, and returned to the LED 413 side. The primary light returned to the LED 413 side is re-entered to the wavelength conversion sheet 420 and wavelength converted to the secondary light thereat. Thus, the primary light is efficiently wavelength converted to the secondary light by the wavelength conversion sheet 420, which is suitable in enhancing the luminance.

Sixth Embodiment

A sixth embodiment will be described with reference to FIG. 23 or 24. In the sixth embodiment, that in which the green light and red light reflection sheet 530 described in the second embodiment is added to the configuration described in the fifth embodiment is shown. Redundant description on the structures, operations, and effects similar to the second and fifth embodiments will be omitted.

Figure 23:
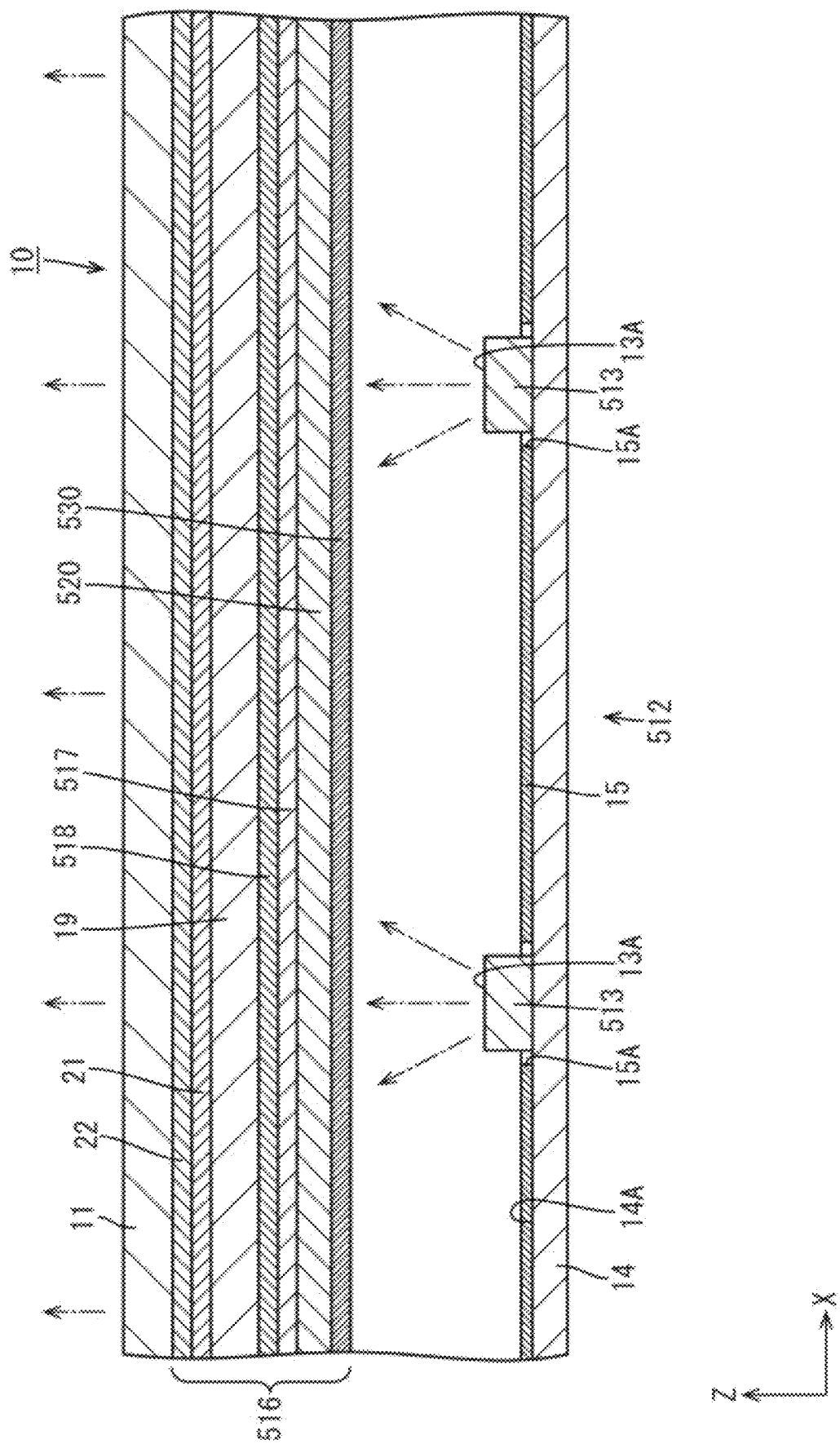
FIG. 23 is a cross-sectional view of a liquid crystal display device according to a sixth embodiment.

As shown in FIG. 23, an optical sheet 516 arranged in a backlight device 512 according to the present embodiment has a stacked order in which the green light and red light reflection sheet 530 is stacked further on the back side of the wavelength conversion sheet 520 stacked on the back side with respect to the first light diffusion sheet 517, that is, the LED 513 side of the light exit path. The green light and red light reflection sheet 530 is disposed closest to the LED 513 in the optical sheet 516, and is disposed on the LED 513 side than the blue light reflection sheet 518. Specific configurations and the like of the green light and red light reflection sheet 530 are as described in the second embodiment above. In such a configuration, the blue light emitted from the LED 513 is transmitted through the green light and red light reflection sheet 530 and reaches the wavelength conversion sheet 520, and one part is wavelength converted to the green light and the red light by the green phosphor and the red phosphor. The green light and the red light advancing toward the LED 513 by being scattered at the time of wavelength conversion and having a small incident angle is reflected with high reflectance by the green light and red light reflection sheet 530 to advance toward the front side. The blue light transmitted without being wavelength converted by the wavelength conversion sheet 520 and having a small incident angle is reflected toward the LED 513 with high reflectance by the blue light reflection sheet 518 having an angle selecting property. The blue light returned toward the LED 513 side is wavelength converted to the green light and the red light by the wavelength conversion sheet 520. The green light and the red light advancing toward the LED 513 by being scattered at the time of wavelength conversion is reflected by the green light and red light reflection sheet 530 to advance toward the front side. Therefore, the efficiency of wavelength conversion by the wavelength conversion sheet 520 is enhanced, and further enhancement of the luminance is achieved.

A sixth comparative experiment below was conducted to verify the superiority of the backlight device 512 including the green light and red light reflection sheet 530, and the like disposed as described above. In the sixth comparative experiment, the following comparative example 7 and examples 6A to 6C were used as the backlight device, and the exit light thereof was observed using a two-dimensional chromameter. The comparative example 7 has a configuration similar to that described prior to the present paragraph other than that the first light diffusion sheet 517 is not provided. The examples 6A to 6C have configurations similar to that described prior to the present paragraph, where the example 6A includes a two-dimensional lens sheet as the first light diffusion sheet 517 (see FIGS. 5 and 6), the example 6B includes a two-dimensional prism sheet as the first light diffusion sheet 517 (see FIGS. 7 and 8), and the example 6C includes a light scattering sheet as the first light diffusion sheet 517 (see FIG. 9). The two-dimensional chromameter used in the observation and the observation contents are the same as those described in the first comparative experiment of the first embodiment. The experiment results are as shown in FIG. 24. Similar to FIGS. 12 and 13, an image photographed with the two-dimensional chromameter, the average luminance measured by the two-dimensional chromameter, and the determination result by visual inspection of a judgement staff are described in the table of FIG. 24.

The experiment results of the sixth comparative experiment will be described. According to FIG. 24, in the comparative example 7, color unevenness and luminance unevenness exceeding the tolerable range are determined to exist by visual observation compared to the examples 6A to 6C. Specifically, in the comparative example 7, a state in which bright portions which are locally bright are arranged at predetermined intervals is visually recognized in the image related to the stimulus value Z, which interval is about the same as the arrangement interval of the LEDs 513. That is, in the comparative example 7, it is found that the exit light quantity of the blue light is locally large in the vicinity of each LED 513 thus causing color unevenness and luminance unevenness. In the examples 6A to 6C, on the other hand, compared to the comparative example 7, it is determined by visual inspection that the color unevenness and luminance unevenness substantially do not exist or even if the color unevenness and luminance unevenness do exist it is to an extent they do not exceed the tolerable range. Specifically, in the example 6A, the bright portions which are locally bright are substantially not visually recognized in the image related to the stimulus value Z, and it is determined that the color unevenness and luminance unevenness substantially do not exist. In the example 6B, the bright portions which are locally bright are substantially not visually recognized in the image related to the stimulus value Z, and it is determined that the color unevenness and the luminance unevenness substantially do not exist. In the example 6C, the bright portions which are locally bright are slightly visually recognized in the image related to the stimulus value Z, and it is determined that the color unevenness and the luminance unevenness are within the tolerable range. Moreover, the experiment results of the examples 6A to 6C are compared with the experiment results (see FIG. 22) of the examples 5A to 5C according to the fifth comparative experiment of the fifth embodiment. Compared to the examples 5A to 5C, in the examples 6A to 6C, the average luminance of the stimulus value X and the stimulus value Y are both higher. Thus, it can be said that the examples 6A to 6C have the highest luminance among the examples 1A to 1C, 2A to 2C, 3A to 3C, 4A to 4C, and 5A to 5C according to the first to fifth comparative examples of the first to fifth embodiments. This is assumed to be the influence of enhancement in the efficiency of wavelength conversion and enhancement in the utilization efficiency of the green light and the red light as, in the examples 6A to 6C, the wavelength conversion sheet 520 also wavelength converts the blue light reflected by the blue light reflection sheet 518 and returned to the LED 513 side in addition to wavelength converting the blue light directly entered from the LED 513, and then reflects the green light and the red light randomly scattered when wavelength converted by the wavelength conversion sheet 520 to be directed toward the LED 513 side with the green light and red light reflection sheet 530 to direct the light toward the exit side of the light exit path.

According to the present embodiment described above, the wavelength conversion sheet 520 and the green light and red light reflection sheet 530 are arranged on the LED 513 side with respect to the blue light reflection sheet 518 in the light exit path. Thus, the primary light emitted from the LED 513 is transmitted through the green light and red light reflection sheet 530 and reaches the wavelength conversion sheet 520, and one part is wavelength converted to the secondary light by the phosphors thereat. The secondary light advancing from the wavelength conversion sheet 520 toward the LED 513 that has a small incident angle is reflected with high reflectance by the green light and red light reflection sheet 530 having an angle selecting property. On the other hand, the primary light transmitted through the wavelength conversion sheet 520 and having a small incident angle is reflected with high reflectance by the blue light reflection sheet 518 having an angle selecting property, and returned to the LED 513 side. The primary light returned to the LED 513 side is wavelength converted to the secondary light by the phosphors in the wavelength conversion sheet 520. Thus, the luminance is further enhanced.

OTHER EMBODIMENTS

The technology described herein is not limited to the embodiment described by the above description and the drawings, and the following embodiments, for example, are also encompassed within the technical scope of the technology described herein.

(1) In each embodiment described above, a case where the first light diffusion sheet is made of any one of a two-dimensional lens sheet, a two-dimensional prism sheet, and a light scattering sheet has been described, but the first light diffusion sheet may be made of, for example, a one-dimensional lens sheet, a one-dimensional prism sheet, and the like. The one-dimensional lens sheet has a configuration in which, for example, a semi-cylindrical unit lens having a circular arc shaped cross-sectional shape and extending along a single axis direction is arrayed in plurals one dimensionally on a front surface of a base material. The one-dimensional prism sheet has a configuration in which, for example, a projection unit lens having a polygonal cross-sectional shape and extending along a single axis direction is arrayed in plurals one dimensionally on a front surface of a base material.

(2) In each embodiment described above, a case where the second light diffusion sheet is made of a light scattering sheet has been described, but the second light diffusion sheet may be made of any one of a two-dimensional lens sheet, a two-dimensional prism sheet, and a light scattering sheet, similar to the first light diffusion sheet. In this case, the first light diffusion sheet and the second light diffusion sheet may be the same member. Furthermore, the second light diffusion sheet may be made of a one-dimensional lens sheet, a one-dimensional prism sheet, and the like described in (1). In this case as well, the first light diffusion sheet and the second light diffusion sheet may be the same member.

(3) In each embodiment described above, a case where that including a dielectric multi-layered film is provided as the blue light reflection sheet has been described, but in addition, for example, that including a multi-layered vapor deposition sheet in which a dielectric having different indices of refraction are multi-layered vapor deposited and formed and a polymer layer having a cholesteric liquid crystal property on a front surface of a substantially transparent base material can be used as the blue light reflection sheet. This is the same for the green light and red light reflection sheet described in the second and sixth embodiments.

(4) In each embodiment described above, a configuration in which the reflection sheet is placed to cover the front side of the LED substrate has been described, but in addition, for example, that in which paint exhibiting white may be applied to the mounting surface of the LED substrate, or that in which the front surface is made of ceramic exhibiting white may be used as the LED substrate.

(5) In each embodiment described above, a backlight device including the second light diffusion sheet has been described, but the second light diffusion sheet may be omitted.

(6) In each embodiment described above, a backlight device including the first luminance enhancing sheet and the second luminance enhancing sheet has been described, but one of or both of the first luminance enhancing sheet and the second luminance enhancing sheet may be omitted.

(7) Other than the embodiments described above, the specific stacking number of layers, stacking order, type, and the like of the optical sheet may be appropriately changed.

(8) In each embodiment described above, a case where the LED that emits blue light is used as the light source has been described, but an LED that emits a color other than blue may be used as the light source, in which case the color to be exhibited by the phosphor contained in the wavelength conversion sheet is to be changed in accordance with the color of the light of the LED. For example, when an LED that emits light of magenta color is used, the illumination light (exit light) of the backlight device can be whitened by using a green phosphor that exhibits green, which is a complementary color of magenta color, as the phosphor to be contained in the wavelength conversion sheet.

(9) Other than (8), when an LED that emits light of purple color is used, the illumination light (exit light) of the backlight device can be whitened by using a green phosphor and a yellow phosphor that exhibit yellowish green color, which is a complementary color of purple color, as the phosphor to be contained in the wavelength conversion sheet.

(10) Other than (8) and (9), when an LED that emits light of cyan color is used, the illumination light (exit light) of the backlight device can be whitened by using a red phosphor that exhibits red color, which is a complementary color of cyan color, as the phosphor to be contained in the wavelength conversion sheet.

(11) In each embodiment described above, a case where the wavelength conversion sheet is configured to include the green phosphor and the red phosphor has been described, but the wavelength conversion sheet may be configured to include only the yellow phosphor or may be configured to include the red phosphor and the green phosphor in addition to the yellow phosphor.

(12) In each embodiment described above, a configuration in which the wavelength conversion sheet includes a quantum dot phosphor has been described, but other types of phosphors may be contained in the wavelength conversion sheet. Other phosphors to be contained in the wavelength conversion sheet may be, for example, sulfide phosphor, but this is not the sole case.

(13) In each embodiment described above, a backlight device including the wavelength conversion sheet has been described, but the backlight device may not include the wavelength conversion sheet. In this case, the LED, which is the light source, is configured to emit white light. Such white light emitting LED is preferably configured to include at least, for example, a blue LED chip that emits a blue light, and a sealing material including a green phosphor and a red phosphor that emits a green light and a red light with the blue light as an excitation light, but this is not the sole case.

(14) In each embodiment described above, a so-called direct type backlight device has been described, but an edge light type backlight device in which the light from the LED is guided by the light guiding plate toward the optical sheet may be adopted.

(15) In each embodiment described above, a case where the LED is used as the light source has been described, but in addition, for example, an organic EL element, a laser diode, and the like may be used as the light source.

(16) In each embodiment described above, a liquid crystal panel has been exemplified as the display panel, but other types of display panels (MEMS (Micro Electro Mechanical Systems) display panel etc.) may be adopted.

The invention claimed is:

1. A lighting device, comprising:
a light source;
a first light reflecting unit arranged on an exit side of a light exit path with respect to the light source to reflect at least a part of a light emitted from the light source and transmit a part of the light, and having an angle selecting property such that a reflectance of a light having a small incident angle becomes higher than a reflectance of a light having a large incident angle;
a first light diffusing unit arranged between the light source and the light reflecting unit in the light exit path to diffuse the light;
a wavelength conversion unit arranged on the exit side of the light exit path with respect to the light source and including a phosphor that wavelength converts a primary light emitted from the light source and emits a secondary light; and
a second light reflecting unit arranged on the light source side with respect to the wavelength conversion unit in the light exit path to reflect at least a part of a light and transmit a part of the light, and having a wavelength selecting property such that a reflectance of the secondary light becomes higher than a reflectance of the primary light, wherein the first light reflecting unit has a wavelength selecting property such that the reflectance of the primary light becomes higher than the reflectance of the secondary light.

2. The lighting device according to claim 1, further comprising a second light diffusing unit arranged between the first light reflecting unit and the wavelength conversion unit in the light exit path to diffuse the light.

3. The lighting device according to claim 1, wherein the second light reflecting unit has an angle selecting property such that the reflectance of the secondary light having a small incident angle becomes higher than a reflectance of the secondary light having a large incident angle.

4. The lighting device according to claim 1, wherein the wavelength conversion unit and the second light reflecting unit are arranged on the exit side with respect to the first light reflecting unit in the light exit path.

5. The lighting device according to claim 4, further comprising a second light diffusing unit arranged between the first light reflecting unit and the second light reflecting unit in the light exit path to diffuse the light.

6. The lighting device according to claim 1, wherein the wavelength conversion unit and the second light reflecting unit are arranged on the light source side with respect to the first light reflecting unit in the light exit path.

7. The lighting device according to claim 1, wherein the wavelength conversion unit is arranged on the exit side with respect to the first light reflecting unit in the light exit path.

8. The lighting device according to claim 1, wherein the wavelength conversion unit is arranged on the light source side with respect to the first light reflecting unit in the light exit path.

9. The lighting device according to claim 1 further comprising a second light diffusing unit arranged to overlap the first light diffusing unit to diffuse the light.

10. A display device comprising:
the lighting device according to claim 1; and
a display panel for displaying an image using light irradiated from the lighting device.

11. A lighting device comprising:
a light source emitting primary light;
a wavelength conversion unit opposed to the light source to be on an exit side of a light exit path with respect to the light source and including a phosphor to convert the primary light emitted by the light source into a secondary light;
a first light diffusing unit including:
    a first surface disposed directly against a front surface of the wavelength conversion unit on an opposite side from the light source and through which the secondary light from the wavelength conversion unit enters; and
    a second surface on an opposite side from the first surface and including irregular sections to diffuse the secondary light;
a first light reflecting unit disposed directly against the second surface of the first light diffusing unit to reflect some rays of the secondary light diffused by the first light diffusing unit and to pass another some of rays of the secondary light diffused by the first light diffusing unit; and
a second light diffusing unit disposed directly against the light reflecting unit to diffuse the other some of rays of the secondary light passing the light reflecting unit.

12. The lighting device according to claim 11, wherein the first light diffusing unit includes unit lenses each having a semi-spherical shape, and
the irregular sections of the second surface include surfaces of the unit lenses.

13. The lighting device according to claim 11, wherein the first light diffusing unit includes unit prisms each having a triangular prism shape; and
the irregular sections of the second surface include surfaces of the unit prisms.

14. The lighting device according to claim 11, wherein the first light diffusing unit includes a base material and scattering particles dispersed in the base material, and
the irregular sections of the second surface include surfaces of the base material.

15. The lighting device according to claim 11, wherein the second light diffusing unit includes a base material and scattering particles dispersed in the base material, and
the second light diffusing unit includes plate surfaces including microscopic bumps randomly arrayed on the plate surfaces.

16. The lighting device according to claim 11, further comprising a second light reflecting unit disposed between the light source and the wavelength conversion unit and including a surface on an opposite side from the light source being disposed directly against the wavelength conversion unit.

17. The lighting device according to claim 16, wherein the first light diffusing unit includes unit lenses each having a semi-spherical shape, and
the irregular sections of the second surface include surfaces of the unit lenses.

18. The lighting device according to claim 16, wherein the first light diffusing unit includes unit prisms each having a triangular prism shape; and
the irregular sections of the second surface include surfaces of the unit prisms.

19. The lighting device according to claim 16, wherein the first light diffusing unit includes a base material and scattering particles dispersed in the base material, and
the irregular sections of the second surface include surfaces of the base material.

20. The lighting device according to claim 16, wherein the second light diffusing unit includes a base material and scattering particles dispersed in the base material, and
the second light diffusing unit includes plate surfaces including microscopic bumps randomly arrayed on the plate surfaces.

21. A lighting device comprising:
a light source emitting primary light;
a first light diffusing unit being on an exit side of a light exit path with respect to the light source, the first light diffusing unit including:
    a first surface opposed to the light source; and
    a second surface on an opposite side from the first surface and including irregular sections to diffuse the primary light;
a first light reflecting unit disposed directly against the second surface of the first light diffusing unit to reflect some rays of the primary light diffused by the first light diffusing unit and to pass another some of rays of the primary light diffused by the first light diffusing unit;
a second light diffusing unit disposed directly against the light reflecting unit to diffuse the other some of rays of the primary light passing the light reflecting unit; and
a wavelength conversion unit opposed to the second light diffusing unit, the wavelength conversion unit including a phosphor to convert the primary light into a secondary light.

22. The lighting device according to claim 21, wherein the first light diffusing unit includes unit lenses each having a semi-spherical shape, and the irregular sections of the second surface include surfaces of the unit lenses.

23. The lighting device according to claim 21, wherein the first light diffusing unit includes unit prisms each having a triangular prism shape; and
the irregular sections of the second surface include surfaces of the unit prisms.

24. The lighting device according to claim 21, further comprising a second reflecting unit disposed between the second light diffusing unit and wavelength conversion unit, the second reflecting unit including a first surface directly against the second light diffusing unit and a second surface directly against the wavelength conversion unit.

* * * * *